United States Patent [19]

Kuwata

[11] Patent Number: 5,434,951
[45] Date of Patent: Jul. 18, 1995

[54] NEURAL NETWORK SYSTEM HAVING MINIMUM ENERGY FUNCTION VALUE

[75] Inventor: Ryuichi Kuwata, Tokyo, Japan
[73] Assignee: Kabushiki Kaisha Toshiba, Kawasaki, Japan
[21] Appl. No.: 94,928
[22] Filed: Jul. 22, 1993

Related U.S. Application Data

[63] Continuation of Ser. No. 855,480, Mar. 23, 1992, abandoned, which is a continuation of Ser. No. 417,449, Oct. 5, 1989, abandoned.

[30] Foreign Application Priority Data

| Oct. 6, 1988 | [JP] | Japan | 63-252711 |
| Jan. 5, 1989 | [JP] | Japan | 64-148 |
| Apr. 10, 1989 | [JP] | Japan | 1-90209 |

[51] Int. Cl.$^6$ ............................................. G06F 9/00
[52] U.S. Cl. ................................... 395/24; 395/23; 395/27
[58] Field of Search ............................ 395/23, 24, 27

[56] References Cited

U.S. PATENT DOCUMENTS

| 3,284,780 | 11/1966 | Clapper | 340/172.5 |
| 3,311,895 | 3/1967 | Clapper | 340/172.5 |
| 4,660,166 | 4/1987 | Hopfield | 364/807 |
| 4,760,604 | 7/1988 | Cooper et al. | 382/15 |
| 4,782,460 | 11/1988 | Spencer | 364/807 |
| 4,796,199 | 1/1989 | Hammerstrom | 364/513 |
| 4,849,925 | 7/1989 | Peckerar et al. | 364/807 |
| 4,858,147 | 8/1989 | Conwell | 364/513 |
| 4,931,674 | 6/1990 | Kub et al. | 307/529 |
| 4,942,517 | 7/1990 | Cok | 395/26 |
| 4,972,363 | 11/1990 | Nguyen et al. | 364/807 |
| 4,988,891 | 1/1991 | Mashiko | 395/25 |
| 5,075,868 | 12/1991 | Andes et al. | 395/24 |
| 5,075,871 | 12/1991 | Weidman | 395/24 |
| 5,170,463 | 12/1992 | Fujimoto et al. | 395/24 |
| 5,285,522 | 2/1994 | Mueller | 395/24 |

FOREIGN PATENT DOCUMENTS

| 1147657 | 6/1989 | Japan | G06F 15/18 |
| 1189753 | 7/1989 | Japan | G06F 15/18 |

OTHER PUBLICATIONS

Lippmann, Richard P., "An Introduction to Computing with Neural Nets", *IEEE ASSP Magazine,* Apr. 1987, pp. 4–21.
Mano, M. Morris, *Digital Logic and Computer Design,* 1979, pp. 164–167.
McClelland et al., *Explorations in Parallel Distributed Processing,* 1988, pp. 121–159.
Kung, "Parallel Architectures for Artificial Neural Nets", *IEEE International Conference on Systolic Arrays,* 1988, pp. 163–174.
Reilly et al., "An Overview of Neural Networks: Early Models to Real World Systems", An Introduction to Neural and Electronic Networks, 1990, pp. 227–248.
Biological Cybernetics, No. 52, pp. 141–152, "Neural Computation of Decisions in Optimization Problems", J. J. Hopfield et al.; 1985.
Proceedings VLSI and Computers First International Conference on Computer Systems and Applications, Hamburg, May 11–15, 1987; pp. 859–863, IEEE, New York, U.S.; M. H. Al-Muifraje: "Networks of memory elements-A processor for industrial piece-parts recognition".
IEEE First International Conference on Neural Networks, San Siego, Calif. Jun. 21–24, 1987; pp. IV-41-7-IV-426; R. P. Lippmann et al.; "Neural-net classifiers useful for speech recognition".
AIP Conference Proceedings 151; Neural Networks for Computing, Snowbird, Utah, 1986, pp. 345–355, American Institute of Physics; P. A. Penz et al.; "Digital signal processor accelerators for neural network simulations".

*Primary Examiner*—Allen R. MacDonald
*Assistant Examiner*—George Davis
*Attorney, Agent, or Firm*—Oblon, Spivak, McClelland, Maier & Neustadt

[57] ABSTRACT

N neural networks having different set-values are provided, where N is an integer greater than 2. Each neural network has plurality of artificial neurons and processes information. An optimal output detecting circuit receives outputs of the N neural networks and determines the optimal one of the neural networks based on the outputs of the N neural networks. An output circuit receives and outputs the output of the neural network detected by the optimal output detecting circuit.

14 Claims, 16 Drawing Sheets

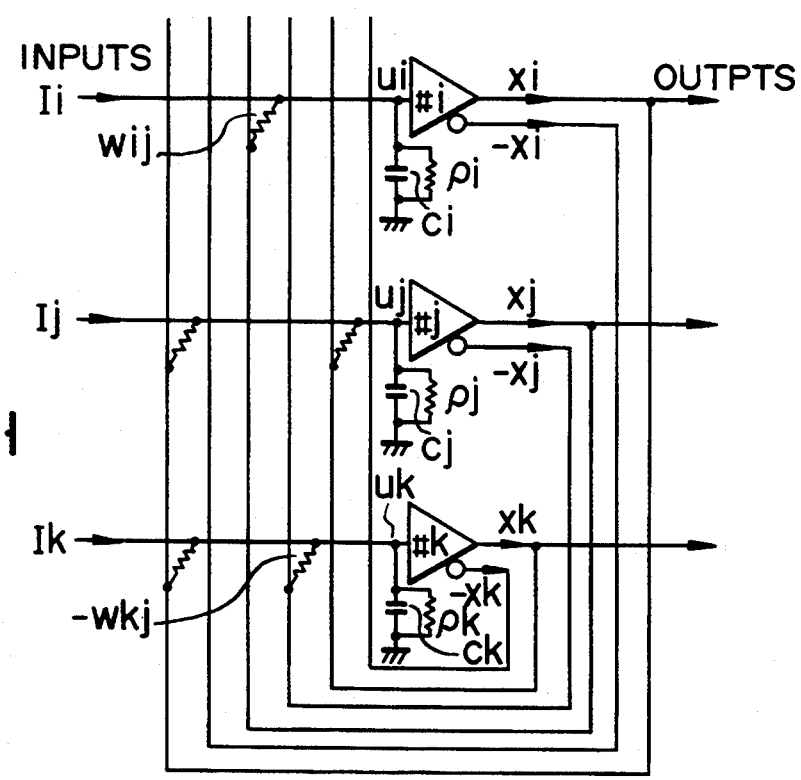
F I G. 1
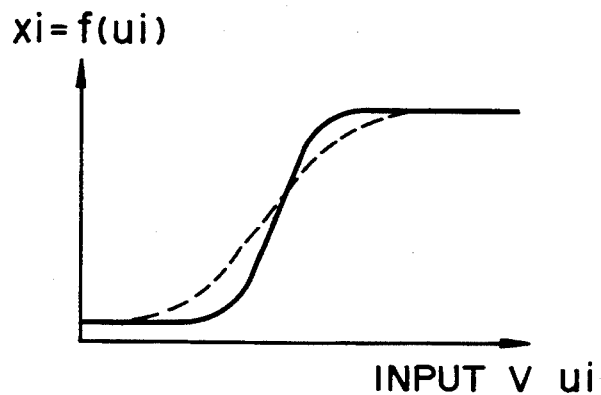
F I G. 2
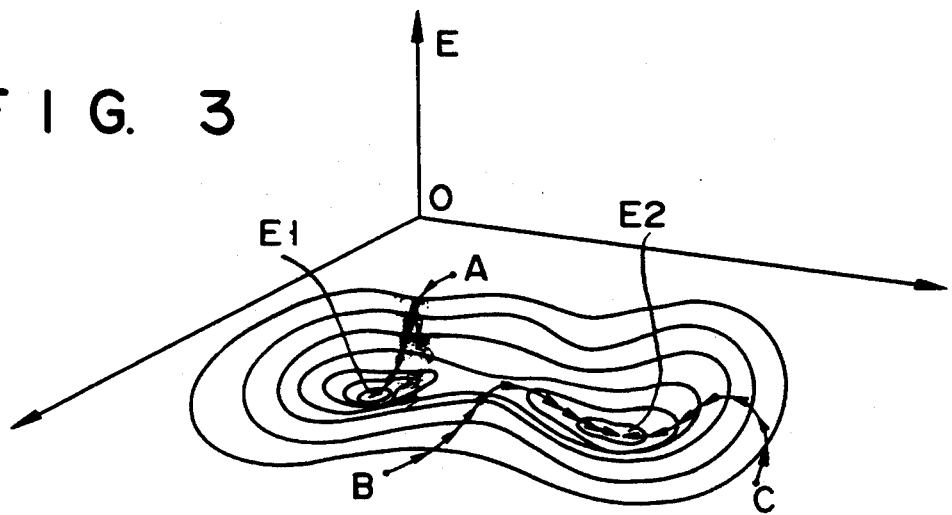
F I G. 3

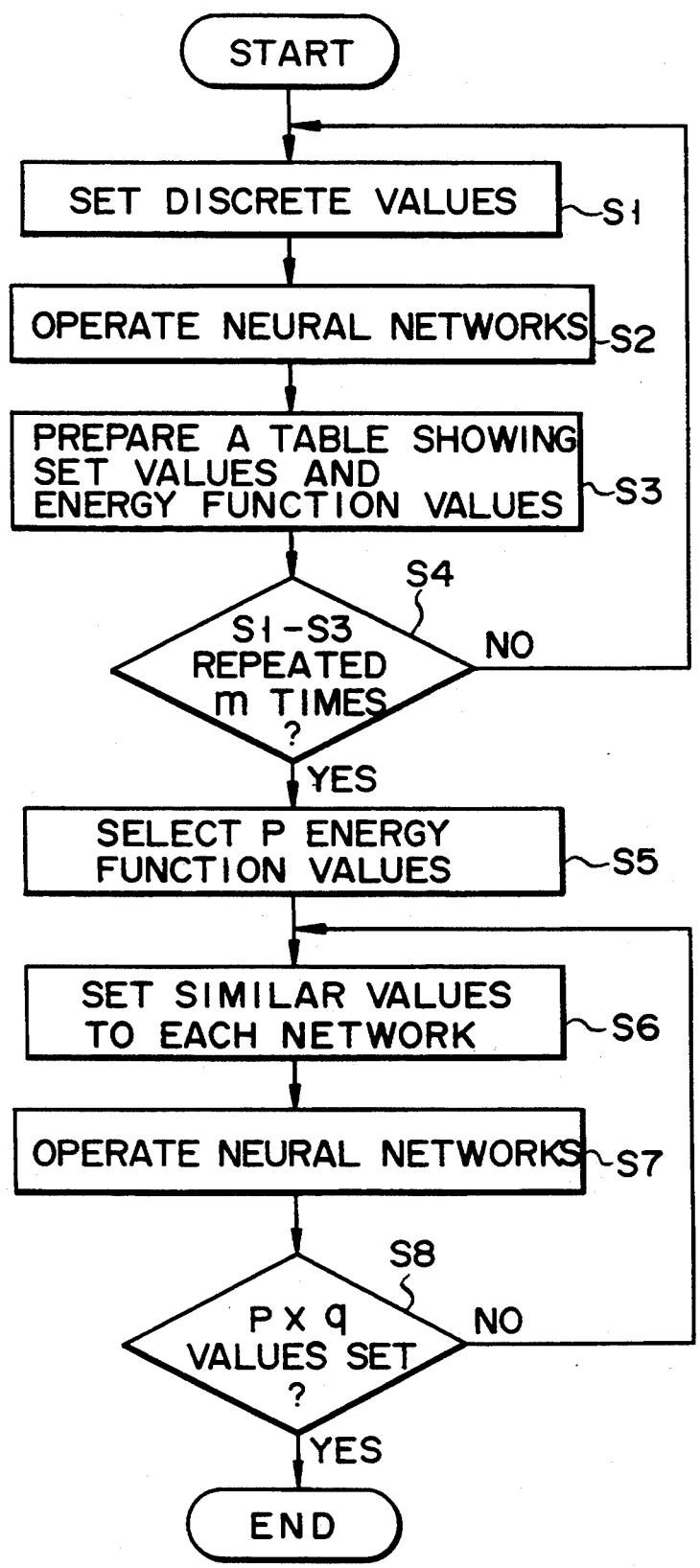
F I G. 7

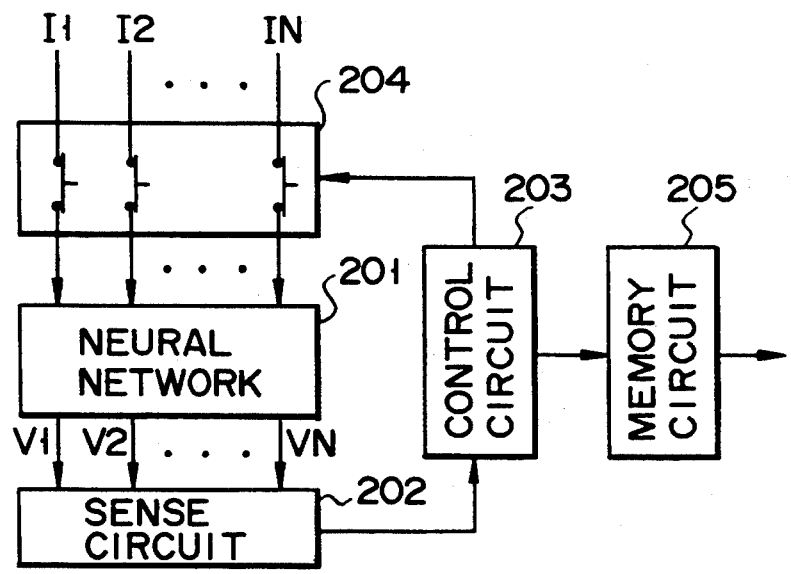
F I G. 11
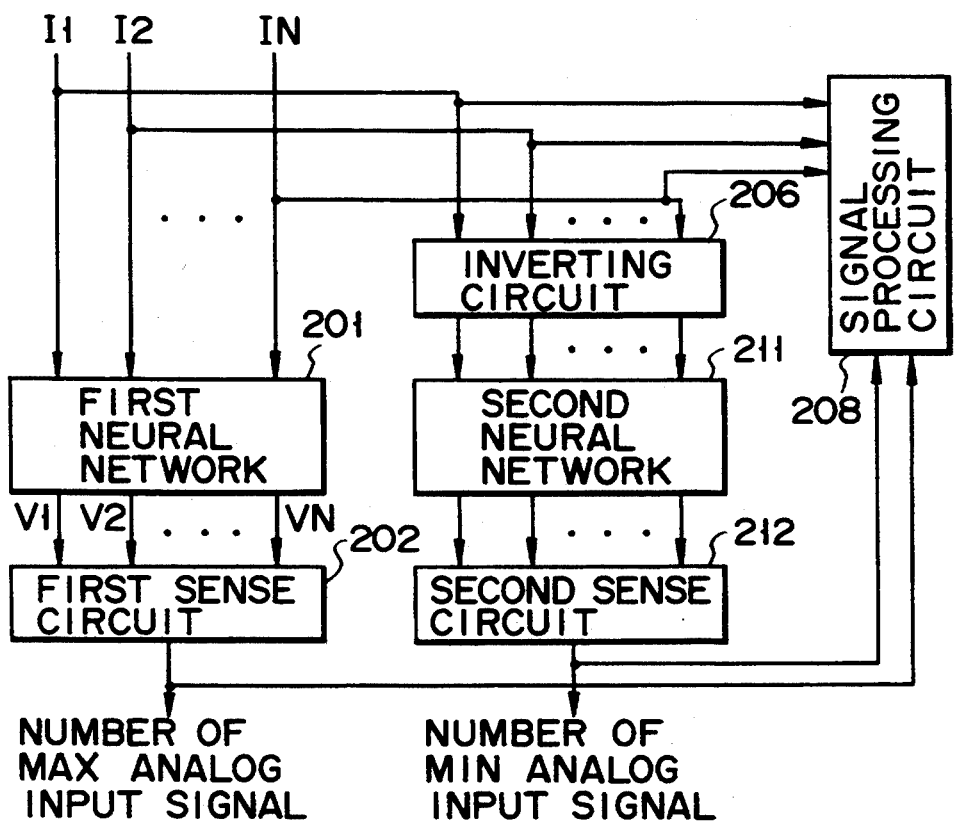
F I G. 12

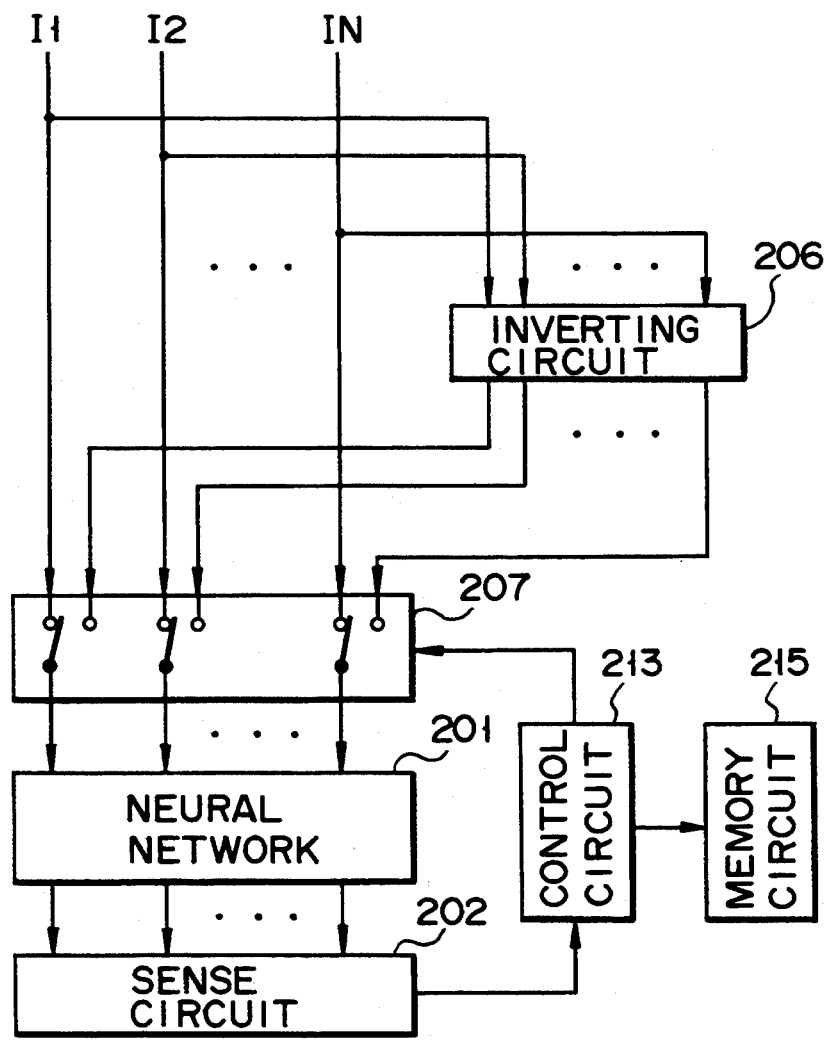
F I G. 13

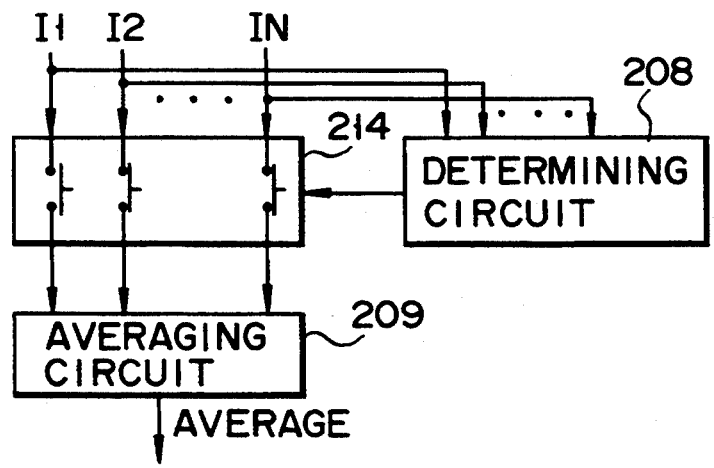
F I G. 14
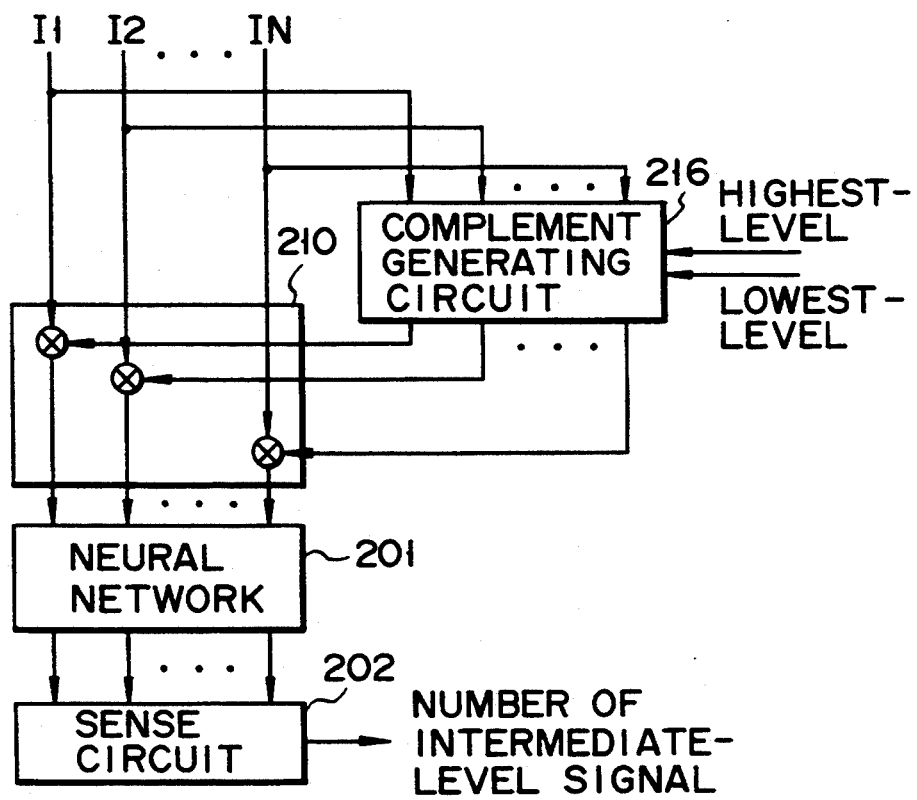
F I G. 15

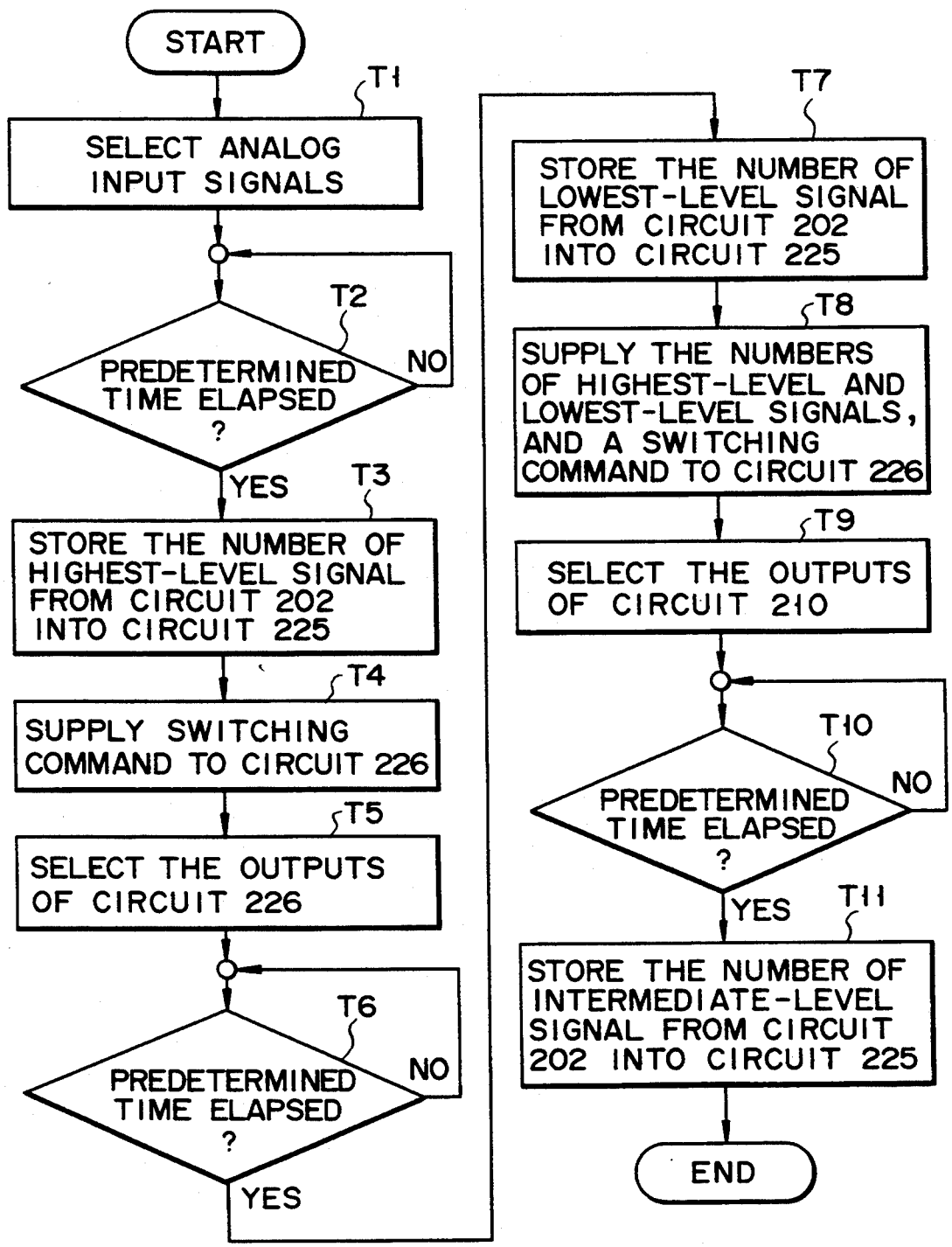
F I G. 18

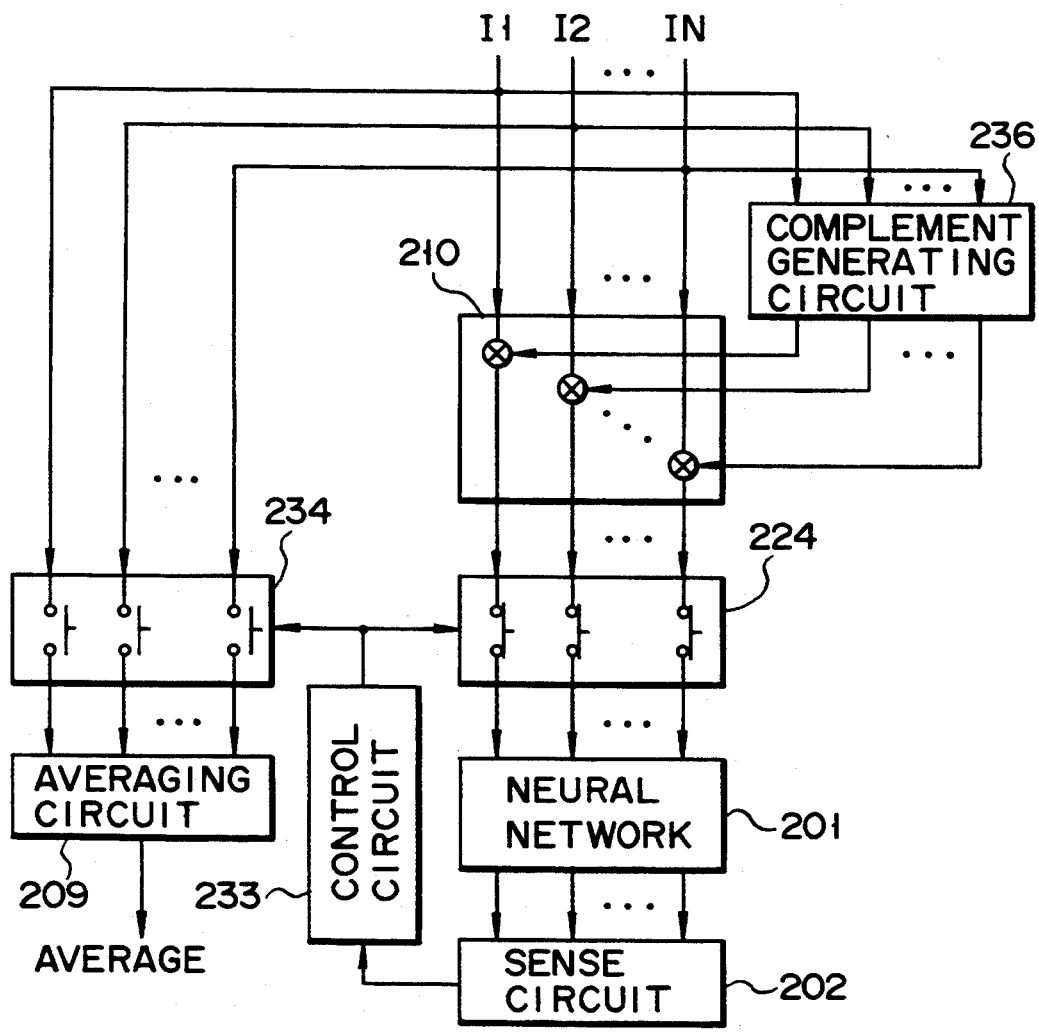
F I G. 19

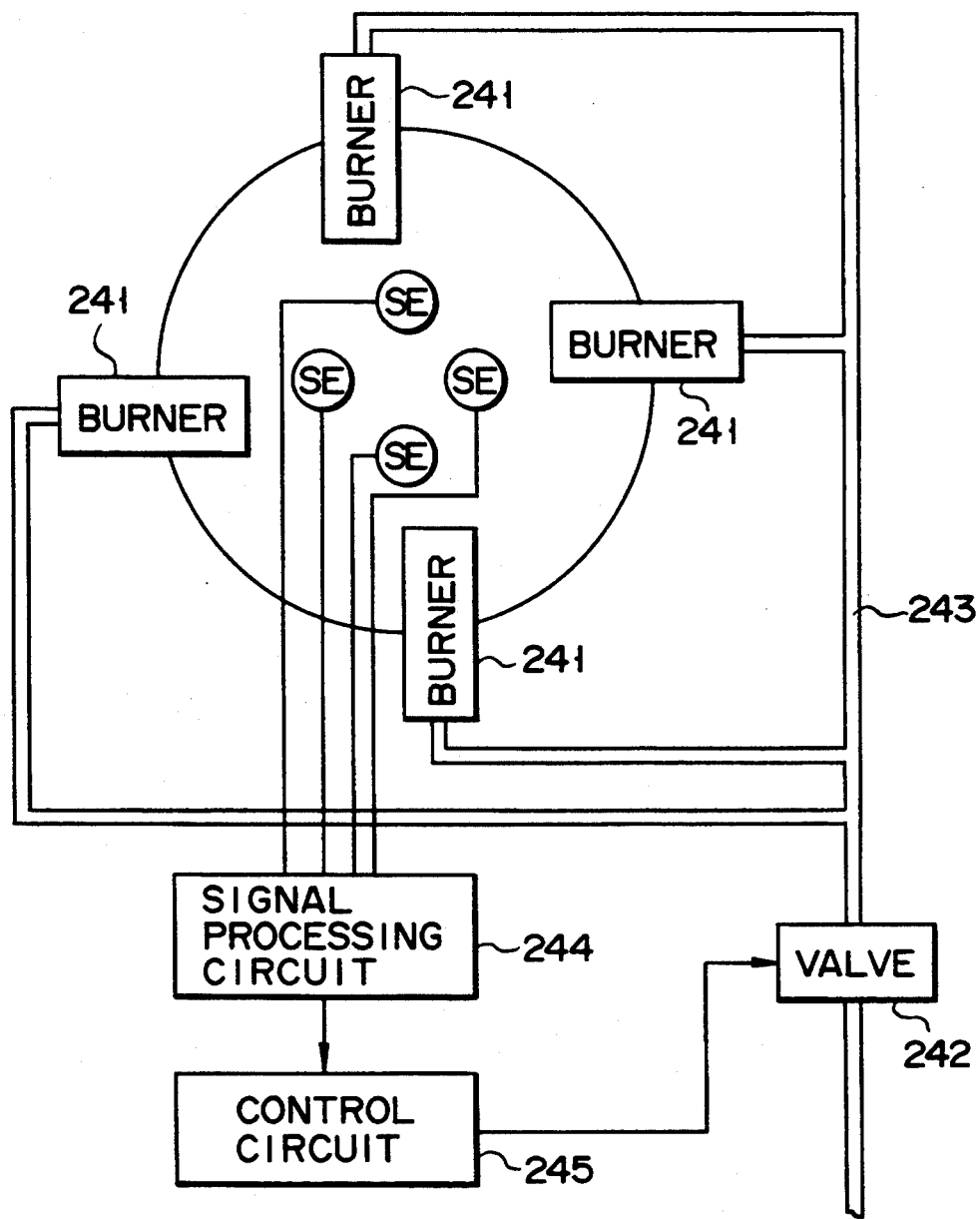
F I G. 20

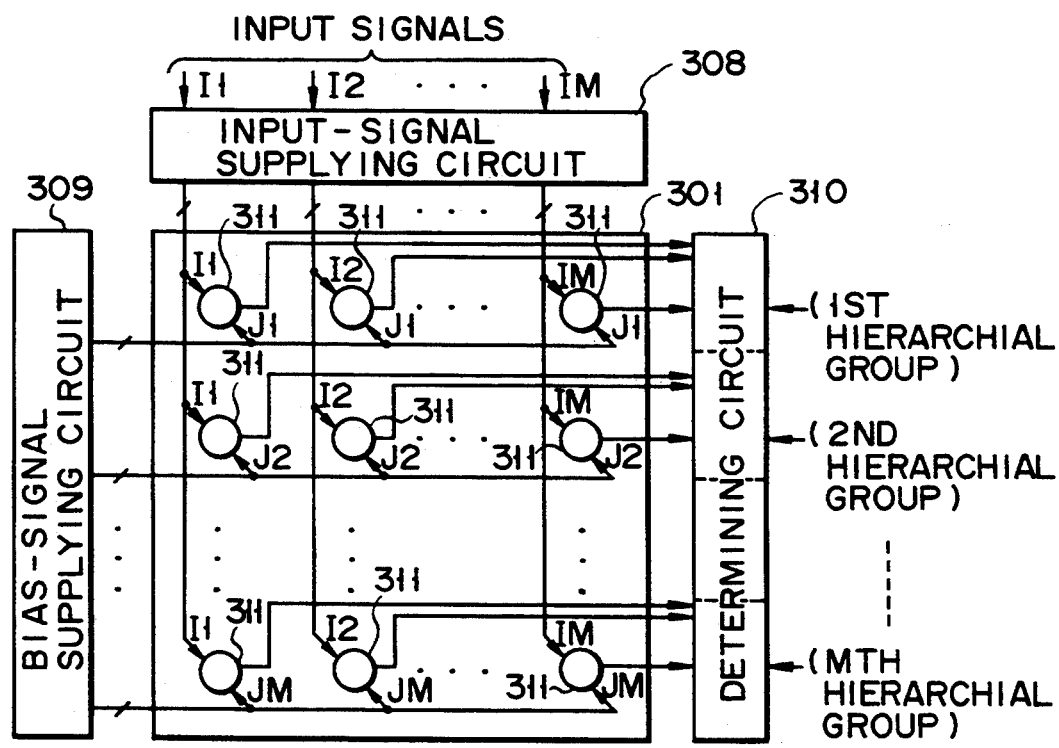
F I G. 21
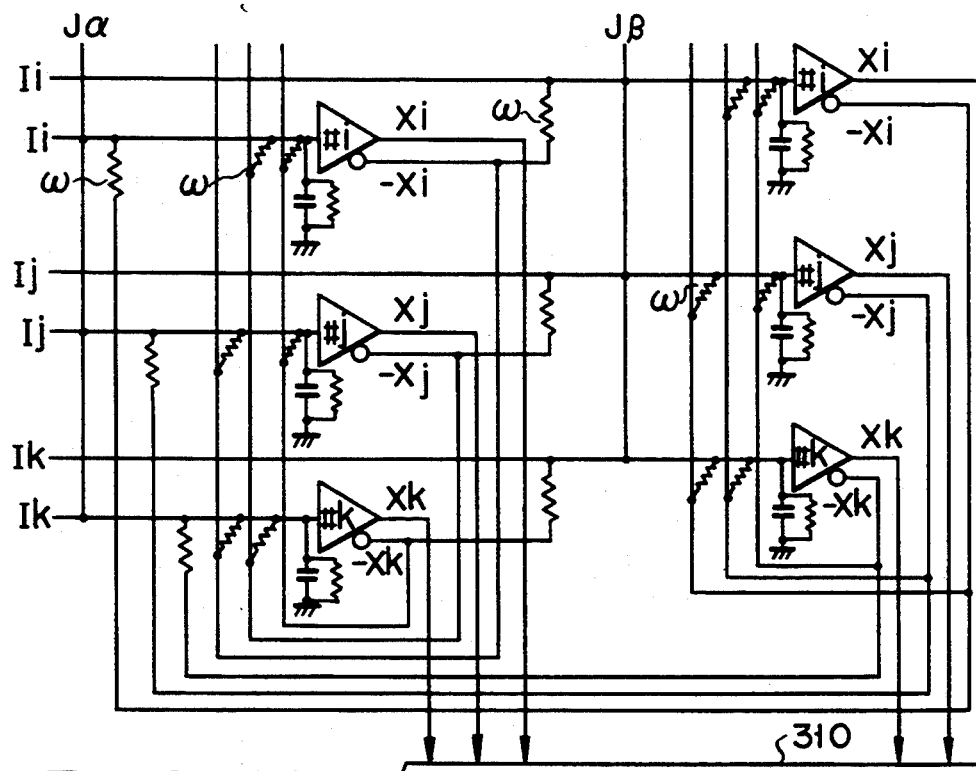
F I G. 22

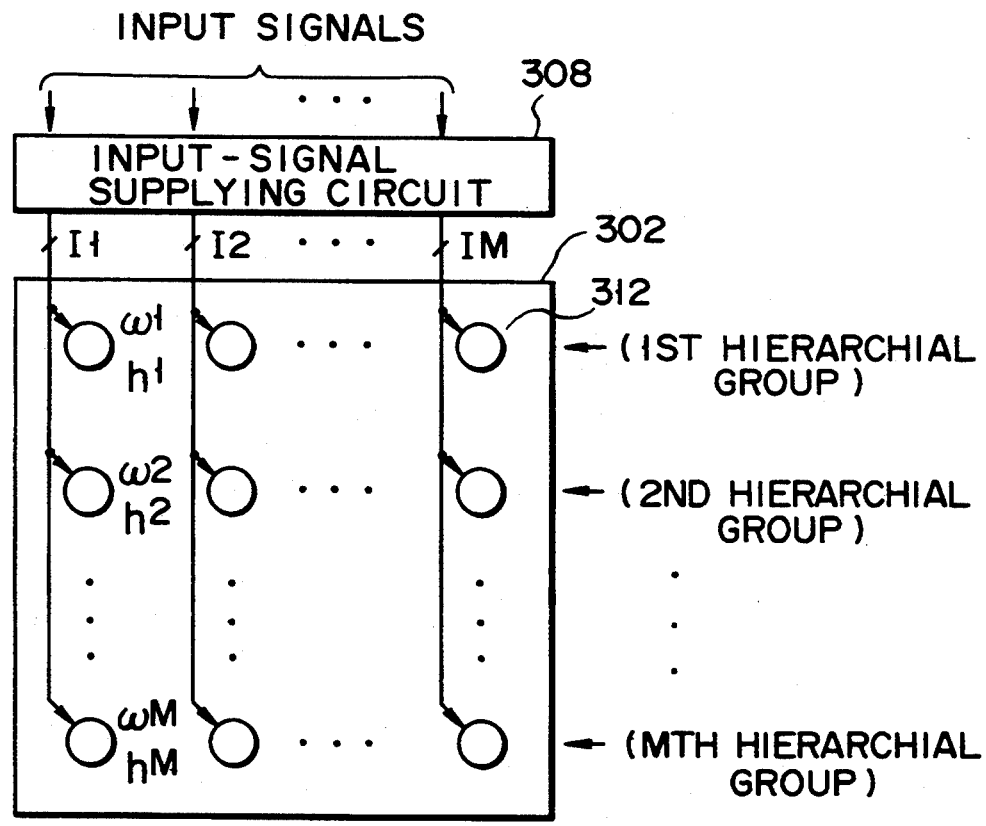
$\omega^i$ : SYNAPTIC CONNECTION COEFFICIENT OF iTH ROW
$(\omega^1 > \omega^2 > \cdots\cdots > \omega^M)$
$h^i$ : THRESHOLD VALUE OF iTH ROW
$(h^1 < h^2 < \cdots\cdots < h^M)$
F I G. 23

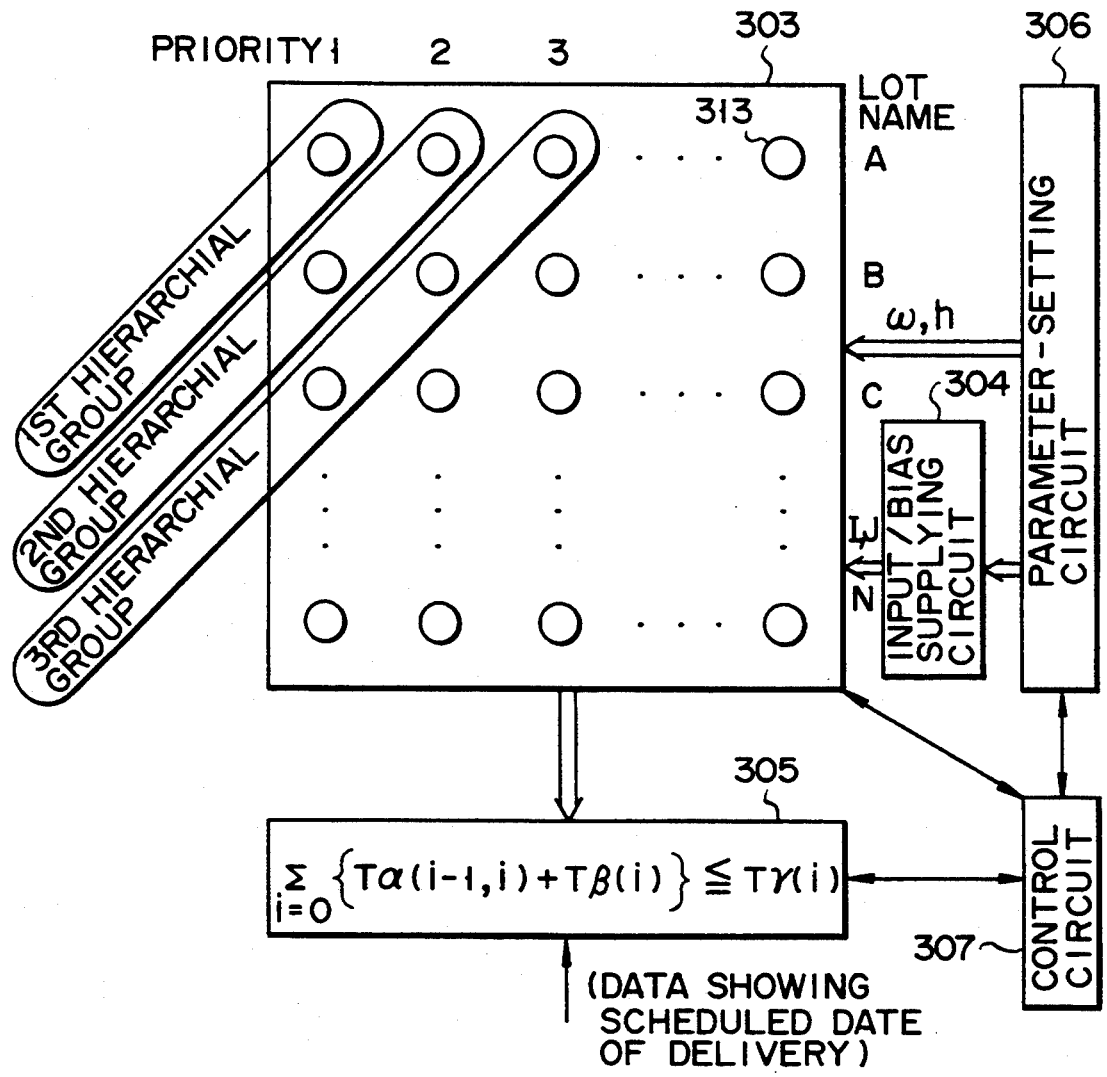
$T\alpha(i-1,i)$ : TIME REQUIRED TO SWITCH TOOLS AND APPARATUSES FOR PRODUCING iTH LOT, INSTEAD OF (i-1)TH LOT
$T\beta(i)$ : TIME REQUIRED TO MANUFACTURE THE iTH LOT OF PRODUCTS
$T\gamma(i)$ : SCHEDULED DATE OF DELIVERING THE iTH LOT OF PRODUCTS
F I G. 24

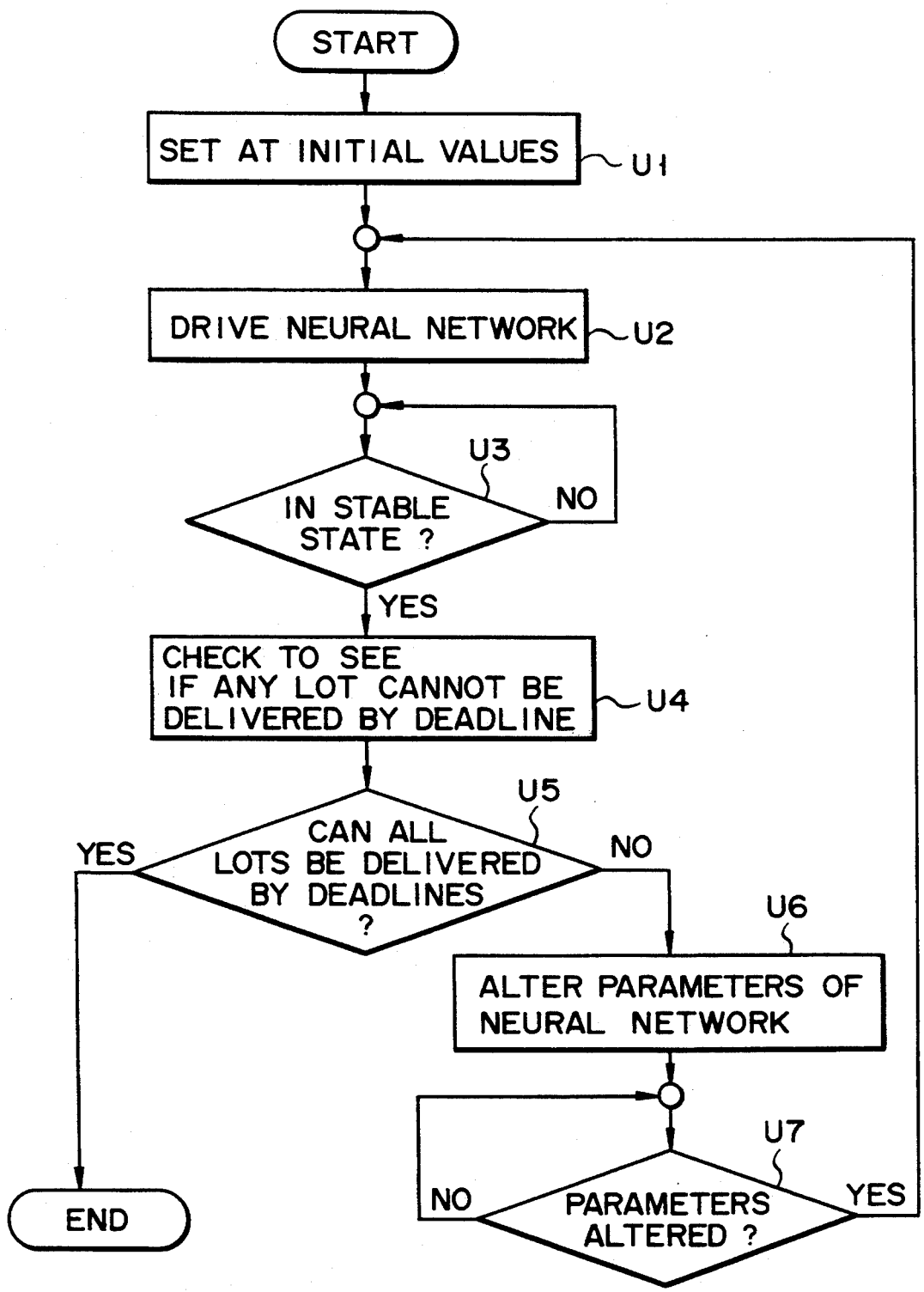
F I G. 25

NEURAL NETWORK SYSTEM HAVING MINIMUM ENERGY FUNCTION VALUE

This application is a Continuation of U.S. application Ser. No. 07/855,480, filed on Mar. 23, 1992, now abandoned which is a continuation of application Ser. No. 07/417,449, filed on Oct. 5, 1989, now abandoned.

BACKGROUND OF THE INVENTION

1. Field of the Invention

The present invention relates to an improvement of a neural network system.

2. Description of the Related Art

A so-called "neural network system" is known which is analogous to the neural networks of animals. Neural network data-processing systems are disclosed in Kazuyuki Aihara, Neural Network Computer, Tokyo Denki University Press, 1988, and in some other publications.

FIG. 1 schematically shows a circuit equivalent to an analog neural network. The amplifiers shown in FIG. 1 correspond to the neurons (i.e., neural cells) of the neural network of an animal. The feedback line of the line, the resistor wij, and the input line correspond to an excitatory synaptic connection in the animal neural network. To constitute a connection equivalent to a inhibitory synaptic connection, the inverted output voltage $-x_j$ of the j-th amplifier is applied to the input of the i-th amplifier.

The current $\Sigma \omega_{ij} \cdot x_j$ flowing through the resistor wij is added to the current Ii supplied to the i-th amplifier from an external device. The sum of the currents $\Sigma \omega_j x_j$ and Ii flows to the ground through a capacitor Ci and a resistor $\rho i$. An input voltage ui is applied to the i-th amplifier.

In most cases, the output function of the i-th amplifier is a sigmoid function represented by the solid line or the broken line in FIG. 2. The i-th amplifier outputs a voltage xi which corresponds to the input voltage ui.

The operating characteristic of the neural network shown in FIG. 1 can be represented by the following equations:

$$C_i \cdot \frac{du_i}{dt} = \sum_{j=1}^{N} w_{ij} \cdot x_j - \frac{U_i}{R_i} + I_i \quad (1)$$

$$x_i = f(u_i) \quad (2)$$

$$\frac{1}{R_i} = \rho_i + \sum_{j=1}^{N} w_{ij} \quad (3)$$

If the synaptic connection in the neural network is a symmetrical one (wij=wji, wii=0), the neural network has the energy function (Liapunov function) defined by the following equation:

$$E = -\frac{1}{2} \sum_{i=1}^{N} \sum_{j=1}^{N} w_{ij} \cdot x_i \cdot x_j - \sum_{i=1}^{N} I_i \cdot x_i + \sum_{i=1}^{N} \frac{1}{R_i} \int_{0}^{x_i} \cdot f^{-1}(x) \, dx \quad (4)$$

The neural network operates to reduce an energy value E. The local minimum value of energy E corresponds to an attracter (a steady state) of the circuit.

When the circuit illustrated in FIG. 1 is used to process information, it is necessary to determine an energy function which indicates an optimal state of the circuit when it takes the minimum value. The energy function can be determined since the minimum value of the energy E corresponds to an attracter of the circuit. The energy function, thus determined, is changed to the form of Equation (4), whereby the synaptic load wij and the input current Ii are set to the circuit shown in FIG. 1. Then, the circuit is operated, whereby the solution of Equation (4) is obtained from the output voltages of the amplifiers.

Most neural networks each have a plurality of attracters. Hence, the energy function represented by Equation (4) has valleys E1 and E2 as is illustrated in FIG. 3. It is desirable that the energy of the network 10 is transferred along route A to the deepest valley E1 as fast as possible, thereby to bring the circuit into a steady state. However, there is the possibility that the energy of the neural network is transferred along route B or C, depending upon, for example, the initial value set to the i-th amplifiers or the value of the output functions of the amplifiers. If the energy is trapped in the shallow valley E2, the neural network is likely to output an inappropriate solution.

Two methods can be employed to prevent the network from outputting an inappropriate solution. The first method is to change either the initial values of the amplifiers or the output function. The second method is to input noises to the amplifiers, so as to prevent the energy of the network from being trapped in the shallow valley E2. Either method, however, is time-consuming and prevents the neural network from processing information at high speed. The use of either method is fatal to the neural network system employed as an on-line, real-time data processing system.

There are systems which are designed to monitor and control distribution systems such as the combustion temperature in a gas turbine, the temperature in a boiler evaporation tube, the temperature in a fuel-cell stack, the temperature in a furnace, the temperature in a chemical reaction tank, the temperature in a room, and the pressure in a water-supply network.

Generally, such systems receive a number of analog input signals from, for example, sensors and employ, as control values, the maximum signal value, the intermediate signal value, the minimum signal value, the mean value of all analog input signals, except the maximum input signal and the minimum input signal, and/or the average value of several analog input signals having values similar to the intermediate value. In such systems, it is necessary to determine signals at the highest level, intermediate level, lowest level and the like from the input analog signals. Conventionally, such determination is performed by comparing the signal levels of the analog input signals repeatedly. Therefore, in the conventional method, it takes a long time to select the signal at a desired level from the plurality of the input analog signals. The Traveling-Salesman Problem to find the shortest possible route along which a salesman can visit all cities he must visit, and the Lot-Production Problem to determine the best possible sequence of producing lots of different articles in a single assembly in order to save time, are called the optimization problems. The optimization problem is solved by computing the evaluation index for any possible combination of items. Hence, the more items there are, the more time the conventional data-processing system will require to solve the optimization problem. More precisely, when the items increase N times in numbers, for example, the time the system requires to solve the problem will increase about $N^3$ times. Therefore, it is practically impossible for an ultra-high-speed computer to find a solution to the optimization problem when there are tens of items involved.

The uses of neural networks to obtain such kind of solutions are disclosed in Hopfield and Tank, "Neural" Computation of Decisions in Optimization Problem, Biol. Cyvbern. Vol. 52, 1985, pp. 141–152.

However, no neural networks have been developed which can determine the signal at a desired signal level.

The neural networks, available at present, are not designed to find solutions which result in an evaluation index optimal for various conditions such as the deadline dates of visits to cities and the deadlines for delivering products.

SUMMARY OF THE INVENTION

Accordingly, it is an object of the invention to provide a useful neural network and a system having this neural network.

It is another object of the present invention to provide a neural network which can determine, at high speed, the signal having a desired level from a plurality of analog signals, and a system having this neural network.

It is still another object of the invention to provide a neural network system which can obtain an optimal solution of an optimization problem, at high speed.

According to a first aspect of the invention, as shown in FIG. 4 as a nonlimiting example, there is provided a neural network system comprising: N neural networks (111-1 ... 111-n) having different set-values, where N is an integer greater than 2; an optimal output detecting circuit (101, 121) for receiving outputs of the N neural networks and determining an optimal neural network; and output circuit (102) for receiving and outputting the an output of the optimal neural network detected by the optimal output detecting circuit.

This neural network system can obtain solutions to problems within a time shorter than the conventional neural network systems.

According to a second aspect of the invention, there is provided a neural network system comprising: a neural network (201) for receiving a plurality of input signals and outputting a signal for detecting any input signal which is at a desired signal level; signal supplying circuit (204) for supplying the input signals to the neural network; and signal detecting circuit (202) for detecting any input signal that is at the desired signal level, in accordance with an output of the neural network (201).

If the desired signal level is set at, for example, the maximum current level of the input signals, this neural network system can detect the signal at the maximum current level, without comparing the input signals repeatedly. And, various kind of controls can be performed by using application of this signal processing.

Further, according to a third aspect of the present invention, there is provided a neural network which comprises a plurality of artificial neurons arranged in rows and columns, connected to one another, and divided into hierarchical groups so that the artificial neurons are easily sparked group by group.

BRIEF DESCRIPTION OF THE DRAWINGS

FIG. 1 is a circuit diagram showing an analog neural network;

FIG. 2 is a graph representing the output function of each amplifier incorporated in the neural network shown in FIG. 1;

FIG. 3 is a diagram schematically explaining the energy function of the neural network illustrated in FIG. 1;

FIG. 7 is a flow chart explaining how the neural network shown in FIG. 6 functions;

FIG. 11 is a block diagram showing another data-processing system according to the invention, which is designed to determine the magnitude of each of analog input signals and places the magnitudes of the input signals in descending order;

FIG. 12 is a block diagram illustrating a data-processing system according to the invention, which is designed to detect, from among the signals input to the system, the highest-level signal, and the lowest-level signal;

FIG. 13 is a block diagram showing a system according to the present invention, wherein one neural network detects the highest-level signal and the lowest-level signal, from among the input signals;

FIG. 14 is a block diagram showing another system according to the invention, which is designed to detect the highest-level signal or the lowest-level signal, from among the input signals, or to obtain the average level of all input signals, except the highest-level signal and the lowest-level signal;

FIG. 15 is a block diagram illustrating a system according to the present invention, which is designed to detect, from among input signals, the signal at the level most similar to the intermediate level of a specified range;

FIG. 18 is a flow chart explaining the operation of the control circuit incorporated in the system shown in FIG. 17;

FIG. 19 is a block diagram showing a system according to the invention, which is designed to obtain the average level of those of the analog input signals which are at levels similar to the intermediate level;

FIG. 20 is a block diagram illustrating a gas turbine control system having a signal-processing circuit which comprises neural networks;

FIG. 21 is a diagram showing a neural network system according to the invention, which comprises artificial neurons combined by inhibitory synaptic connection and in which bias signals of different values are supplied to hierarchical groups of neurons, so that the artificial neurons are easily sparked, group by group;

FIG. 22 is a circuit diagram showing part of the neural network incorporated in the system illustrated in FIG. 21;

FIG. 23 is a block diagram showing another neural network system according to the invention, which comprises artificial neurons combined by inhibitory synaptic connection, and in which different connection coefficients or different threshold values are assigned to the hierarchical groups of the neurons, so that the neurons are easily sparked, group by group;

FIG. 24 is a block diagram illustrating another neural network system according to the invention, which comprises artificial neurons combined by synaptic connection, and which is designed to determine a sequence of items which is optimal under specific conditions; and FIG. 25 is a flow chart explaining the operation of the con circuit incorporated in the system shown in FIG. 24.

DETAILED DESCRIPTION OF THE PREFERRED EMBODIMENTS

First Embodiment

Figure 4:
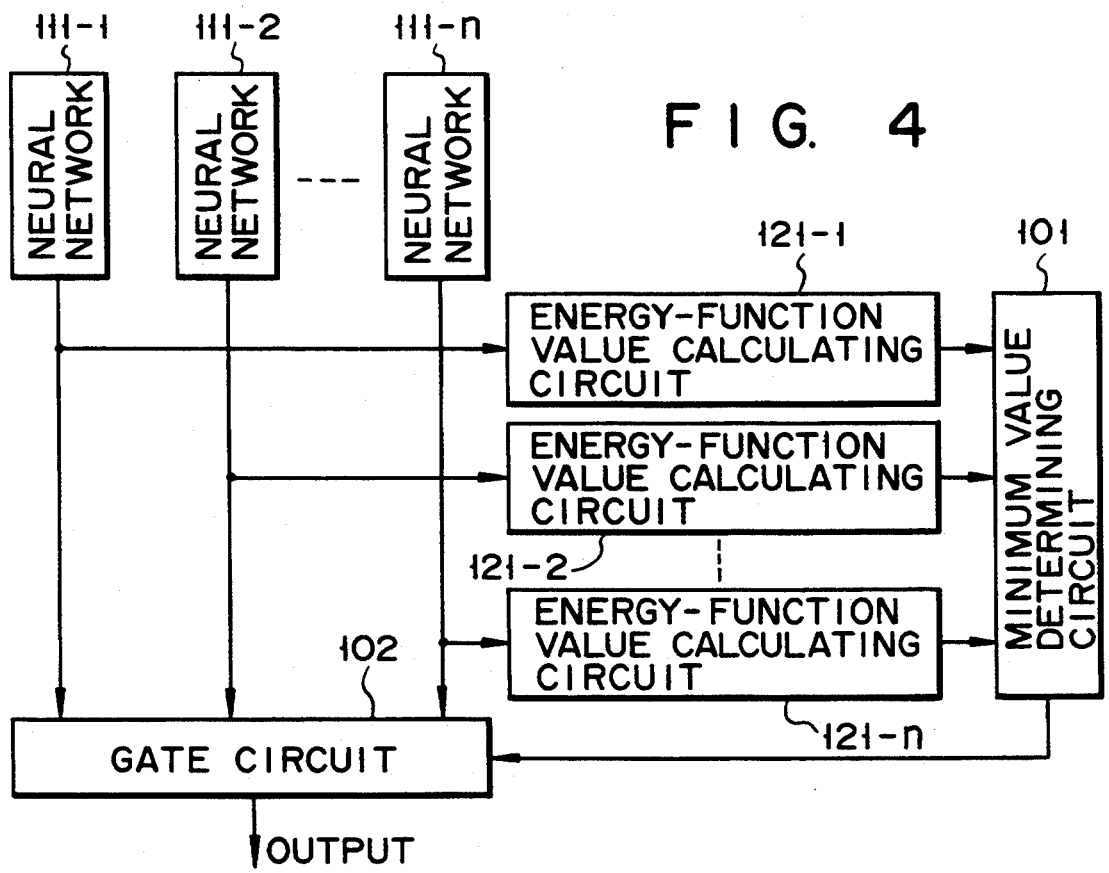
FIG. 4 is a block diagram illustrating a data-processing system according to the present invention.

A system according to the first embodiment of the invention will be described with reference to FIG. 4. As is shown in FIG. 4, the system comprises n neural networks 111-1 to 111-n, n energy-function value calculating circuits 121-1 to 121-n, a minimum value determining circuit 101, and a gate circuit 102. The calculating circuits 121-1 to 121-n are connected to the neural networks 111-1 to 111-n, in one-to-one correspondence. The minimum value determining circuit 101 is connected to the outputs of the calculating circuits 121-1 to 121-n. The gate circuit 102 is connected to the outputs of the neural networks 111-1 to 111-n, and also to the output of the minimum value determining circuit 101.

The neural networks 111-1 to 111-n are identical in structure. They have, for example, the structure illustrated in FIG. 1. The outputs of the neural networks 111-1 to 111-n are supplied to the calculating circuits 121-1 to 121-n, respectively. The calculating circuits 121-1 to 121-n can be of the type generally known in the art. For instance, they can be calculating devices each of which comprises a buffer for receiving the outputs of the amplifiers incorporated in the associated neural network, a CPU for processing the output of the amplifier, and some peripheral circuits. The calculating circuits 121-1 to 121-n calculate the energy-function values E of the corresponding neural networks 111-1 to 111-n, by performing the operation of Equation (4) on the outputs of artificial neurons used in the neural networks, and the sizes of the synaptic connections of these neurons. The values E, thus calculated, are input to the minimum value determining circuit 101. The circuit 101 determines which neural network has the least energy, based on the outputs of the circuits 121-1 to 121-n, and then outputs a gate command to the gate circuit 102. The gate circuit 102 comprises, for example, a three-state buffer. In response to the gate command, the gate circuit 102 supplies the output of the neural network having the least energy, to an external device.

An operation of the system shown in FIG. 4 will be described below. To operate the system, the energy function required for solving a problem has been determined. In accordance with this energy function, a synaptic load Wij and an input current Ii are determined. The synaptic load Wij and the input current Ii, thus determined, are set to the neural networks 111-1 to 111-n and also to the energy-function value calculating circuits 121-1 to 121-n.

To solve the Traveling-Salesman Problem, for example, by means of the system shown in FIG. 4, the energy function is defined by:

$$E = \frac{A}{2} \sum_y \sum_i \sum_{j \neq i} x_{yi} \cdot x_{yj} + \frac{B}{2} \sum_i \sum_y \sum_{y \neq z} x_{yi} \cdot x_{zi} + \quad (5)$$

$$\frac{C}{2} \left( \sum_y \sum_i x_{yi} - m \right)^2 + \frac{D}{2} \sum_y \sum_{z \neq y} \sum_i d_{yz} \cdot x_{yi} \cdot (x_{z,i+1} + x_{z,i-1})$$

In Equation (5), $x_{yi}$ is the output of the amplifier incorporated in each neural network, which represents a city to visit, $d_{yz}$ is the distance between city y and city z, and A, B, and C are weighting constants for items. When $x_{yi}$ is "1", city y is the ith city that the salesman must visit.

The first term of Equation (5) is "0" when the salesman is to visit a city only once, or not to visit it at all. The term takes a positive value when the solution to the problem is that the salesman is to visit the same city two or more times. Hence, the more times he is to visit the same city, the greater the first term of the Equation (5), and the greater the energy function value E.

The second term of Equation (5) takes a positive value when the solution to the problem is that the salesman is to visit two more cities at the same time, which is impossible.

The third term of Equation (5) is "0" when the solution to the problem is that the salesman is to visit m cities, and takes a positive value when the solution is that he is not to visit m cities. Therefore, when the number of cities he is to visit, for example, is less than m cities, the third term takes a positive value, and the energy function value E increases.

The fourth term of Equation (5) represents the sum of the distances between the cites the salesman is to visit. Hence, the longer the salesman is to travel, the greater the fourth term. Therefore, the optimal solution will be given when the energy function value E is minimum.

Equation (5) is transformed into Equation (4), whereby the synaptic load wij is determined by the quadratic term of Equation (5), and the input current Ii is determined by the linear terms of Equation (5). The synaptic load wij and the input current Ii, thus obtained, are set to the neural networks 111-1 to 111-n and also to the energy-function value calculating circuits 121-1 to 121-n. In Equation (4), the third term on the right side is much less than the first term and the second term, and can be neglected in finding the energy function value E. Therefore, the value of the energy function E can be determined from Equation (5), instead of Equation (4), in order to solve the Traveling-Salesman Problem. If this is the case, A, B, C, D, m (m: an integer), and $d_{yz}$ are set to the energy-function value calculating circuits 121-1 to 121-n, instead of the synaptic load Wij and the input current Ii. When the conditional terms, i.e., the first, second, and third terms of Equation (5), are satisfied, the energy-function value calculating circuits 121-1 to 121-n can be of the type which finds the energy-function values from only the evalution-function term, i.e., the fourth term of Equation (5).

Next, sets of set-values are set to the neural networks 111-1 to 111-n. For example, the sigmoid function represented by the solid line in FIG. 2 is set to the ith amplifier of one of the networks, whereas the sigmoid function represented by the broken line in FIG. 2 is set to the ith amplifier of another network. Other set-values, such as an initial value and a bias voltage, are set to each neural network. The set of values set to one neural network can includes a set-value identical to the corresponding one of any other set. Alternatively, the set of values set to one neural network can consist of constants A, B, C, and D which are different from the corresponding constants of the set of values set to any other neural network, so that different values of wij and different values of Ii are set to the neural networks 111-1 to 111-n. It is sufficient that each set of set-values is different, as a whole, from any other set of set-values.

Then, the neural networks 111-1 to 111-n are driven simultaneously, producing outputs. The energy-function value calculating circuits 121-1 to 121-n monitor the changes of the outputs from the neural networks 111-1 to 111-n, or the changes of the outputs of the amplifiers incorporated in the neural networks. The calculating circuits 121-1 to 121-n calculate the energy function values E of the neural networks 111-1 to 111-n when the outputs of these networks become steady. Alternatively, the energy function values E can be calculated upon lapse of a predetermined time after the start of operating the neural networks 111-1 to 111-n. The minimum value determining circuit 101 compares the calculated energy function values E, and determines which neural network has less energy than any other neural network. The circuit 101 outputs a gate command for causing the gate circuit 102 to allow the passage of the output of the neural network having the least energy.

In response to the gate command supplied from the minimum value determining circuit 101, the gate circuit 102 allows the passage of the output of the neural network having the least energy. The output of this neural network is the output of the system.

The neural networks 111-1 to 111-n, with different sets of set-values set to them, operate at the same time, and the output of the network having less energy than any other network is used as output of the system. The system can, therefore, find an optimal solution within a short time.

The neural networks used in the above embodiment are not limited to the analog type illustrated in FIG. 1. They can be of the type comprising digital operation elements. In this case, Equation (1) is transformed to a discrete one.

Figure 5:
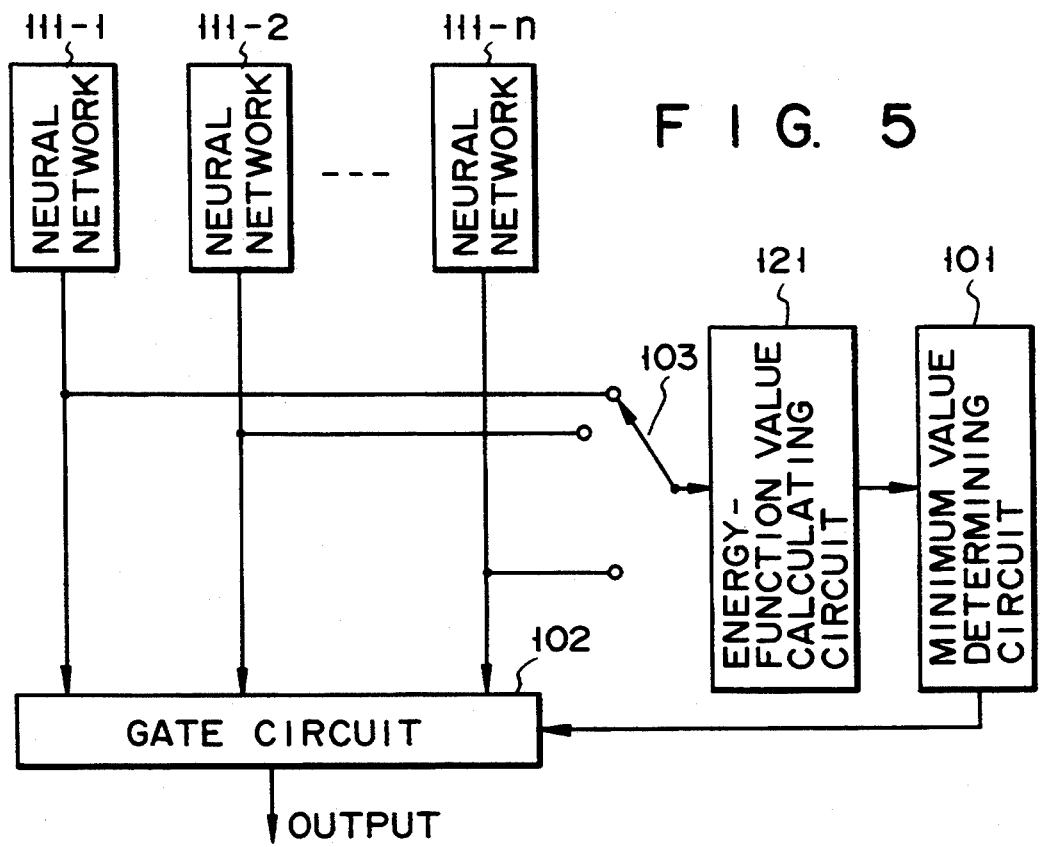
FIGS. 5 and 6 show two modifications of the system illustrated in FIG. 4.

FIG. 5 illustrates a modification of the system shown in FIG. 4. As is shown in FIG. 5, only one energy-value calculating circuit 121 is used in this modification. The calculating circuit 121 is connected to neural networks 111-1 to 111-n, one after another, by means of a switch 103. Thus, the circuit 121 calculates the energy function values E of the networks 111-1 to 111-n, in time-sharing fashion. The energy function values E are sequentially input to a minimum value determining circuit 101. The determining circuit 101 stores the values E and compares them, determining which neural network has the least energy. Then, the determining circuit 101 outputs a gate command for causing a gate circuit 102 to allow the passage of the output of the neural network having the least energy. The system shown in FIG. 5 is advantageous in the case where the time which the calculating circuit 121 requires to determine the network having the least energy is much shorter than the time the neural networks 111-1 to 111-n require to go into steady states after they have started operating.

Figure 6:
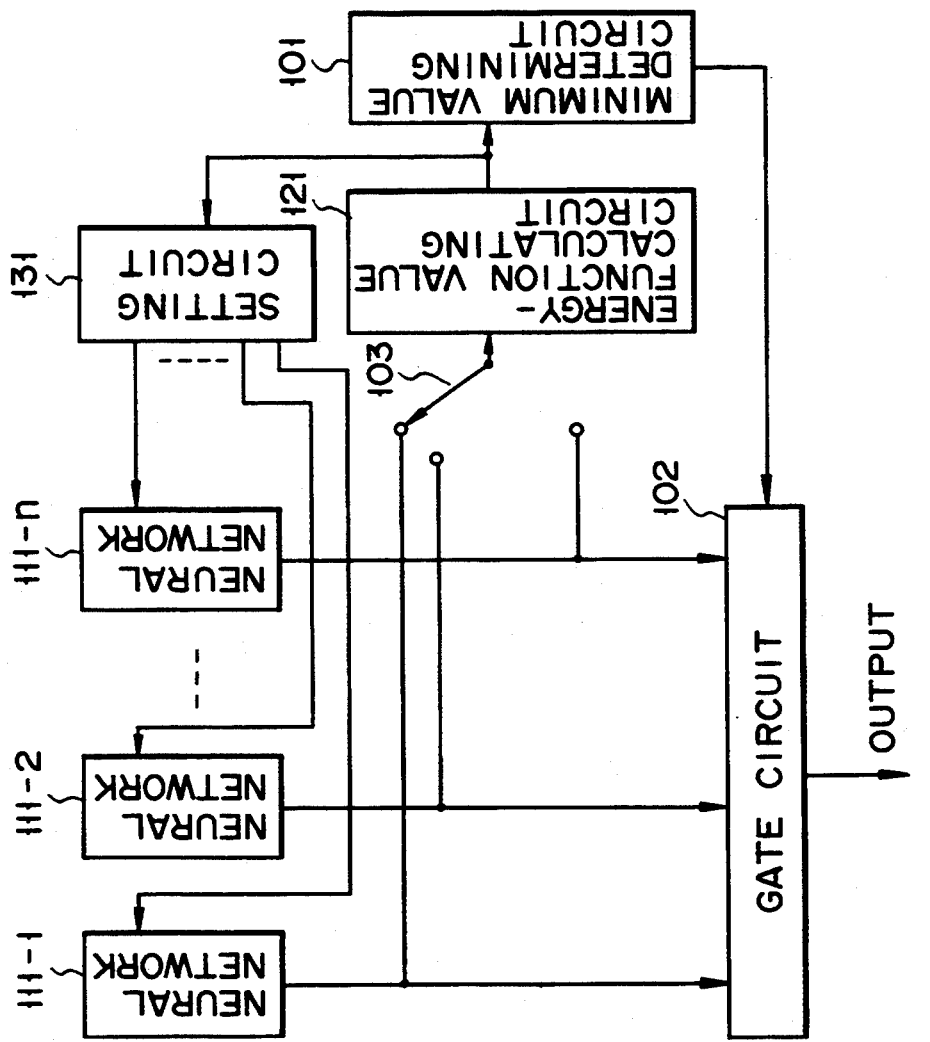

FIG. 6 illustrates another modification of the data-processing system shown in FIG. 4. This modification is a combination of the system shown in FIG. 5 and a setting circuit 131. The setting circuit 131 is connected to receive the outputs of the energy-function value calculating circuit 121, and also to the amplifiers of the neural networks 111-1 to 111-n. The setting circuit 131 is designed to set the sigmoid functions, bias values, initial values, and the like to the amplifiers. The setting circuit 131 comprises a CPU, a memory, and an I/O device connected to the amplifiers of the neural networks 111-1 to 111-n.

The operation of the system shown in FIG. 6 will now be explained, with reference to the flow chart shown in FIG. 7. First, the setting circuit 131 sets set-values, which are discrete as much as possible, to the neural networks 111-1 to 111-n (Step S1). The networks start operating (Step S2). The energy-function value calculating circuit 121 monitors the outputs of the neural networks 111-1 to 111-n. When the outputs of the networks reach steady states, the circuit 121 calculates the energy function values E of the neural networks 111-1 to 111-n. The minimum value determining circuit 101 determines which energy function value is minimum, and outputs a gate command for causing a gate circuit 102 to pass the output of the neural network having the least energy.

The setting circuit 131 prepares and stores, in the memory, a table showing the correspondence between an energy function values E and the corresponding values set to the neural networks 111-1 to 111-n (Step S3). Then, the operation returns to step S1, and steps S1 to S3 are repeated m times (Step S4). As a result of this, $m \times n$ set-values and corresponding $m \times n$ energy function values E are obtained.

Then, the setting circuit 131 selects p energy function values which are less than the other (Step S5). The circuit 131 determines q steps of set-values which are similar values for each of the set-values corresponding to the p energy function values E. The setting circuit 131 sets the similar set-values to the neural networks 111-1 to 111-n (Step S6). The setting circuit 131 then drives the neural networks 111-1 to 111-n (Step S7). The energy-function value calculating circuit 121 obtains energy function values E and supplies these values E to the minimum value determining circuit 101. Next, it is determined whether or not $p \times q$ sets of set-values have been set to the neural networks 111-1 to 111-n (Step S8). If NO, the operation returns to Step S6. Steps S6 and S7 are repeated seven times, until $p \times q$ sets of set-values are set to the networks. If YES in Step S8, the system stops operating.

Since the values set in Steps S1 to S4 are discrete, there is no possibility that the energy of the system is trapped in only one shallow valley (E2 in FIG. 3). Since the set-values set in Steps S5 to S8 are similar to the set-values set when relatively small energy function values E are obtained, it is relatively easy to determine which neural network has the least energy. Therefore, the minimum energy function value can be obtained within a short time.

Figure 8:
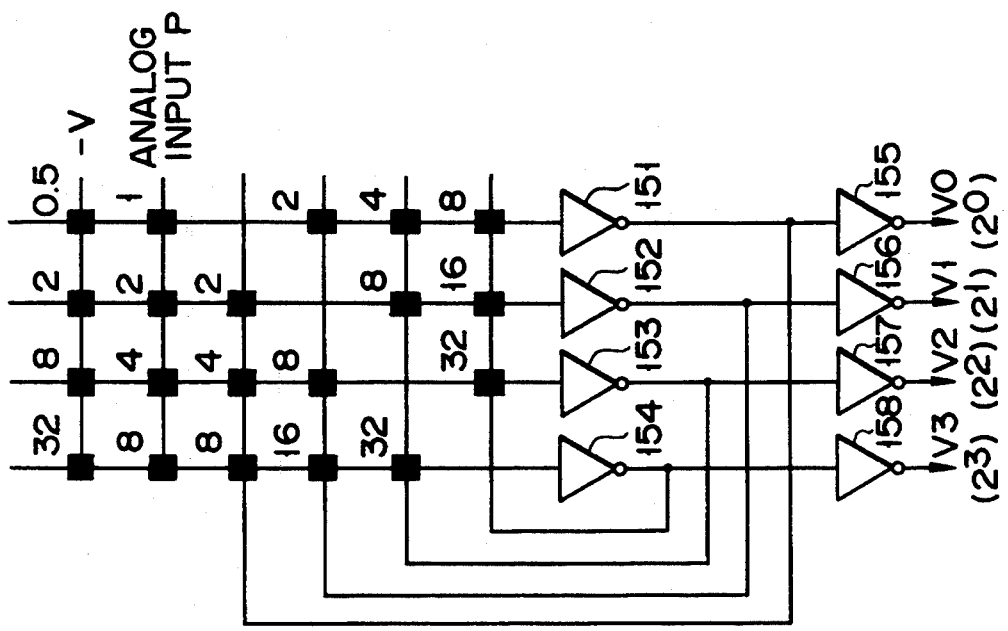
FIG. 8 is a circuit diagram of a neural network designed to convert analog data to 4-bit digital data.

FIG. 8 illustrates a neural network for use in a 4-bit A/D converter. As can be understood from FIG. 8, the neural network has four neurons, i.e., four inverters 151 to 154. Analog voltage signal P is input to the neural network, which outputs four bits, i.e., voltages V0 to V3. The energy function of this neural network is represented by the following equation:

$$E = \frac{1}{2}\left(P - \sum_{j=0}^{3} 2^j \cdot V_j\right)^2 + \sum_{j=0}^{3} 2^{2j-1}[V_j(1-V_j)] \quad (6)$$

Equation (6) can be changed to the following equation:

$$E = -\frac{1}{2} \sum_{j=0}^{3} \sum_{i(\neq j)=0}^{3} (-2^{i+j}) \cdot V_i \cdot V_j - \quad (7)$$

$$\sum_{i=0}^{3} (-2^{2i-1} + 2^i \cdot P)V_i + \frac{1}{2} P^2$$

By comparing Equation (7) with Equation (4), we obtain the parameters of the neural network, which are given:

$$w_{ij} = -2^{i+j} \quad (8)$$

$$I_i = (-2^{2i-1} + 2^i \cdot P) \quad (9)$$

In FIG. 8, the black squares represent interconnections, and the numbers printed beside the black squares represent the strengths of these interconnections. As is evident from these numbers, for example, the analog input P is multiplied by 4 and the multiplied signal is supplied to the second neuron 153. The outputs of the neurons 151 to 154 are inverted by inverters 155 to 158.

Figure 9:
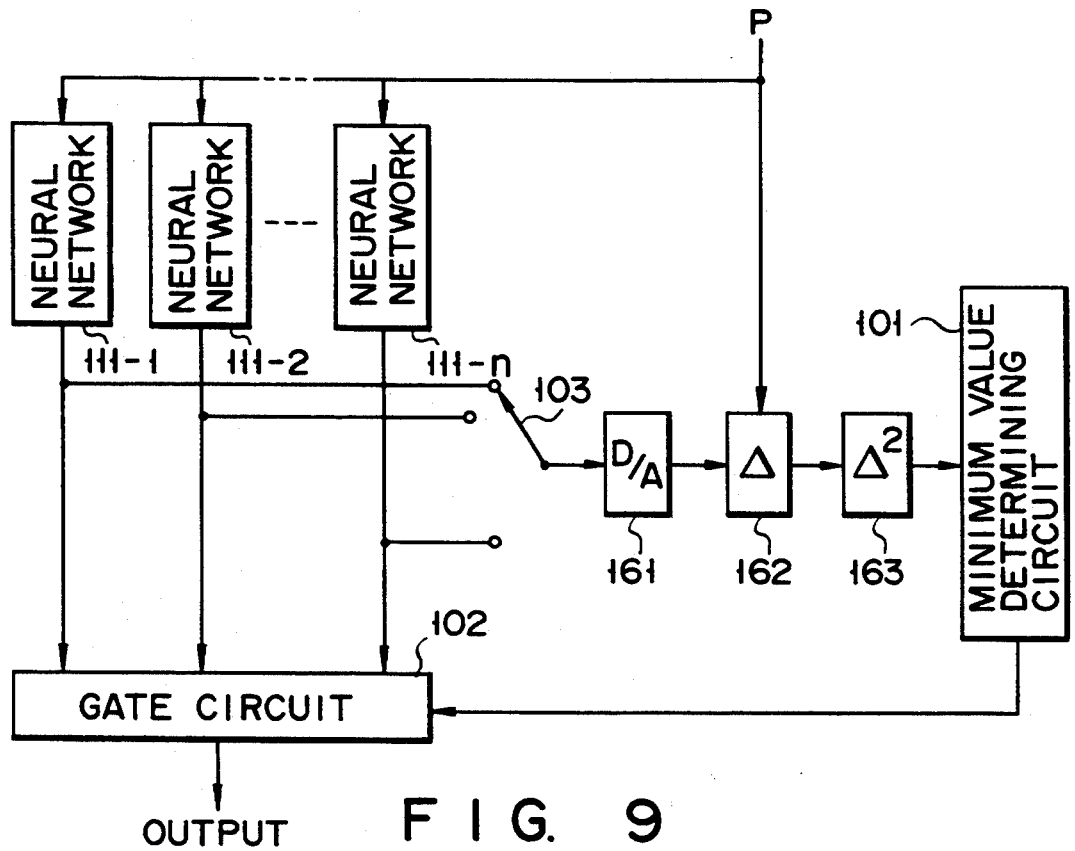
FIG. 9 is a block diagram illustrating an A/D converter which comprises neural networks of the type shown in FIG. 8.

FIG. 9 illustrates a system comprising n neural networks 111-1 to 111-n of the type shown in FIG. 8, a digital-to-analog (D/A) converter 161, a deviation calculator 162, a square circuit 163, a minimum value determining circuit 101, a gate circuit 102, and a switch 103.

The D/A converter 161 converts the outputs of the neural networks 111-1 to 111-n into voltages. The output voltages of the D/A converter 161 are input to the deviation calculator 162. A voltage P is input to the calculator 162. The calculator 162 finds the deviation Δ between each output voltage of the D/A converter 161 and the input voltage P. The deviation Δ, thus found, is multiplied by itself by means of the square circuit 163. The output of the square circuit 163, i.e., Δ², is input to the minimum value determining circuit 101. The circuit 101 determines the neural network whose output deviates least from the input voltage P, and outputs a gate command to the gate circuit 102. In response to the gate command, the gate circuit 102 passes the output of said neural network. The output passing through the circuit 102, i.e., the voltages v0 to v3 (FIG. 8), is the digital value which corresponds to the input voltage P.

The setting circuit 131 shown in FIG. 6 can be incorporated into the data-processing system illustrated in FIG. 9.

Generally, when a neural network reaches a steady state, its energy function value decreases to local minimum, but not always to an absolute minimum. It is therefore necessary to operate the neural network repeatedly, each time setting new initial values, new output functions and so on, to the amplifiers incorporated in the network. This cancels out the advantage of the neural network, i.e., the high-speed operation. As has been described, the system according to the invention comprises a plurality of neural networks having different set values such as initial values of the neurons and output functions of the neurons. The neural networks are operated substantially at the same time, and the system automatically outputs the output of the network whose energy function value is less than that of any other network. The system can, therefore, process data at high speed. More specifically, since the system has n neural networks 111-1 to 111-n, it can process data n times faster than the conventional system which has only one neural network. In view of this, the data-processing system according to the present invention is suitable for on-line, real-time data processing.

Second Embodiment

A system according to a second embodiment of the invention will now described.

Figure 10:
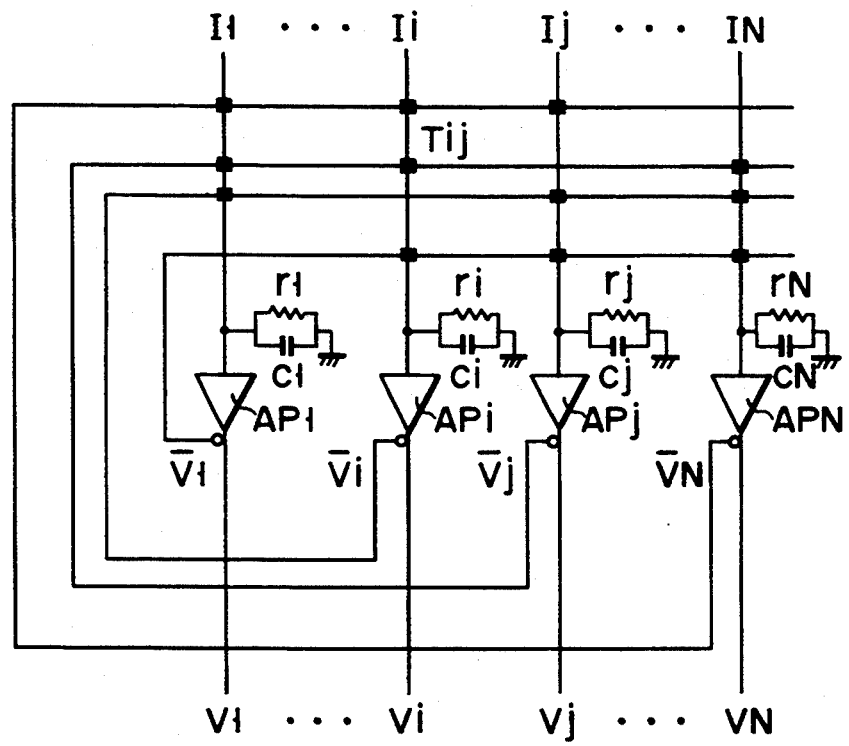
FIG. 10 is a circuit diagram representing a neural network wherein artificial neurons are combined by inhibitory synaptic connection.

FIG. 10 illustrates the neural networks. As FIG. 10 shows, the neural network comprises N amplifiers AP1 to APN which correspond to the neural cells of an animal. The feedback line of the j-th amplifier APj, for applying voltage $\overline{V_j}$ (the inverted output voltage Vj of the amplifier APj), is connected to the input of the i-th amplifier APi through a resistor (or conductance Tij). This connection is equivalent to an inhibitory synaptic connection.

The current $\Sigma T_{ij} \cdot \overline{V_j}$ ($=-\Sigma T_{ij} \cdot V_j$) flowing to the amplifier APi from other amplifiers through resistors is added to the current Ii flowing to the APi from an external device. The sum of these current flows to the ground through a capacitor Ci and a resistor ri. As a result, an input voltage Ui is applied to the input of the i-th amplifier APi.

The characteristic of the neural network illustrated in FIG. 10 is represented by the following equations:

$$C_i \cdot \frac{dU_i}{dt} = -\frac{U_i}{R_i} - \sum_j T_{ij} \cdot \overline{V_j} + I_i \quad (10)$$

$$\frac{1}{R_i} = \frac{1}{r_i} + \sum_{j=1}^{N} T_{ij} \quad (11)$$

$$V_i(t) = -\overline{V_i(t)} = g[U_i(t)] \quad (12)$$

$$g(x) = [1 + \tanh(x/x_0)] \quad (13)$$

When the synaptic connections in the neural network shown in FIG. 10 are symmetrical (Tij=Tji), the neural network reduces the energy function value E (a Liapunov function value) represented by Equation (14). The minimum of this value E corresponds to the attracter of the circuit shown in FIG. 10.

$$E = -\frac{1}{2} \sum_{ij} (-T_{ij}) V_i V_j - \sum_i I_i V_i + \sum_i \frac{1}{R_i} \int_0^{V_i} g^{-1}(V) dV \quad (14)$$

$$= \frac{1}{2} \sum_{ij} T_{ij} V_i V_j - \sum_i I_i V_i + \sum_i \frac{1}{R_i} \int_0^{V_i} g^{-1}(V) dV$$

When inhibitory synaptic connections are established in the network (Tij>0 if j≠i; or Tij=0 if j=i), the first term on the right side of Equation (14) will be "0" if at least one amplifier outputs a voltage of "1", whereas the other amplifiers output voltages of "0". The second term on the right side of Equation (14) is minimal when the amplifier which has received the maximum current is supplied, outputs a voltage of "1". The third term on the right side of Equation (14) can be neglected since its value is extremely small. On the other hand, when the conductances Tij (i≠j) of the inhibitory synaptic connections are equal to one another, the energy function E becomes minimal if the amplifier which has received the maximum current outputs a voltage of "1", whereas the other amplifiers output voltages of "0".

The neural network shown in FIG. 10 can instantly detect the greatest of the n analog inputs, provided that the time constant Ci.ri of each artificial neuron is sufficiently small. Hence, when this neural network is combined with other circuits, thus forming a system which can process a number of analog input signals, in various ways. To be more precise, the system can perform the following signal-processing at high speed:

(1) To detect the analog input signal at the highest level of all analog input signals. Not to supply with the neural network with the detected signal, the analog input signal at the second highest level can be detected. Similarly, the analog input signal at the third highest level and so forth can be detected. Hence, the system can place the some or all of the analog input signals in descending order.

(2) To invert the order in which the analog input signals has been placed in terms of their magnitudes. Two methods can be used to place the signals in ascending order. The first method is to invert the analog input signals. The second method is to convert the level of each analog input signal into a complement of a specific range.

(3) To perform the signal-processing described in paragraphs (1) and (2), thereby to obtain the average level of all analog input signals, except the highest-level signal and the lowest-level signal which are more likely to be incorrect than the other input analog signals.

(4) To perform the signal-processing described in paragraphs (1) and (2), thereby to check as to whether or not the highest-level input signal exceeds an upper limit, and whether or not the lowest-level input signal exceeds an lower limit. This processing allows for an easy alarming with regard to many similar analog input signals.

(5) To determine one of the analog input signals, which is at a level most similar to the intermediate level of a specified range. More specifically, the complement to the level X of an analog input signal is given as $(S+L)-X$, where S and L are the upper and lower limits of the level range within which the level X falls. When the signal at the complement level $(S+L)-X$ is analogously multiplied by the signal at the level X, the following results are obtained:

$$Y = X[(S + L) - X] \tag{15}$$
$$= -[X - (S + L)/2]^2 + [(S + L)/2]^2$$

Signal Y comes to have a maximum magnitude when $X=(S+L)/2$, that is, when the analog input signal is at the intermediate level. Hence, the signal at the level most similar to the intermediate level can be detected, by detecting the signal Y at its highest level. Further, the average level of the analog input signals can be used as the upper or lower limit of a range, whereby the analog input signal at a level most similar to the average level can be detected.

(6) Not to supply with the neural network with the analog input signal at the level most similar to the intermediate level, which has been determined by the signal-processing described in paragraph (5), and to repeat this signal-processing, thereby to determine 10 the several analog input signals which are at levels similar to the intermediate level, and find an average the levels of these analog input signals.

The data-processing system according to the second embodiment of the invention will now be described, with reference to FIG. 11. As FIG. 11 shows, this system comprises a neural network 201, a sense circuit 202, a control circuit 203, an exclusion circuit 204, and a memory circuit 205. The neural network 201 is identical to the network illustrated in FIG. 10. It has N input terminals and N output terminals, N being an integer greater than 1. The sense circuit 202 is connected to the output of the network 201, more precisely, the outputs of the amplifiers incorporated in the network 201. The sense circuit 202 determines which amplifier has produced an output of "1". Analog signals are supplied from external devices, such as a temperature sensor, a pressure sensor, and the like, to the input terminals of the exclusion circuit 204. The sense circuit 202 and the exclusion circuit 204 are connected to the control circuit 203. The sense circuit 202 specifies an analog input signal. The control circuit 203 supplies an exclusion command to the exclusion circuit 204, thereby to prevent the circuit 204 from supplying the analog input signal specified by the sense circuit 202, to the neural network 201.

The control circuit 203 is connected to the memory circuit 205 which stores analog input signals I1 to IN in descending order, for supplying these signals to the control circuit 203 when necessary.

The sense circuit 202 has a counter, a changeover switch, and a comparator. The counter counts the clock pulses supplied from an external clock generator. The comparator compares the level of the signal output from the network 201 and designated by the count value of the counter, with a reference level. The count value, which the counter has when the comparator detects that the designated signal is at a level higher than the reference level, is output from the sense circuit 202. This count value, which identifies the highest-level input signal, is supplied to the control circuit 203.

The exclusion circuit 204 has N switches (e.g., relays) which are turned on or off in accordance with the control signals supplied from the control circuit 203. Each switch has an input terminal, an output terminal, and a control terminal. The input terminal is connected to receive an analog input signal. The output terminal is connected to the corresponding input terminal of the neural network 201. The control terminal is coupled to the control circuit 203.

The control circuit 203 comprises a microprocessor, a memory storing control programs, and peripheral circuits. The output port of the microprocessor is connected to the control terminals of the switches incorporated in the exclusion circuit 204. The input port of the microprocessor is coupled to the output terminals of the sense circuit 202.

The memory circuit 205 is, for example, a dual-port memory connected by a bus to the microprocessor incorporated in the control circuit 203. The dual-port memory has N storage areas for storing the numbers of analog input signals, in descending order in terms of the levels of the input signals. The dual-port memory is connected to, for example, a programmable controller. The contents of the dual-port memory are used for process control.

The operation of the data-processing system shown in FIG. 11 will now be explained.

In the initialized state, the exclusion circuit 204 supplies all analog input signals $I_1$ to $I_N$ to the neural network 201. In the neural network 201, the amplifier supplied with the analog input signal at the highest level (i.e., the signal of the greatest current) outputs a signal at logic "1" level which is higher than the reference level. For instance, when the analog input signal $I_1$ has a greater current value than any other input signals, the amplifier $AP_1$ (FIG. 10) outputs a signal at logic "1" level, whereas all other amplifiers $AP_2$ to $AP_N$ (FIG. 10) output signals at logic "0" level.

The sense circuit 202 detects the signal at logic "1" level output from the neural network 201. The circuit 202 supplies data representing the serial number of this output signal, to the control circuit 203. In this instance, the data represents "1" since the analog input signal $I_1$ has the greatest current value. The control circuit 203 supplies this data to the memory circuit 205. The memory circuit 205 stores the data, "1", in the storage area for the maximum analog input signal. Meanwhile, the control circuit 203 outputs an exclusion command to the exclusion circuit 204, for opening the switch assigned to the maximum analog input signal. In response to the exclusion command, the circuit 204 opens the switch assigned to the maximum analog input signal. As a result of this, the analog input signal $I_1$, i.e., the maximum analog input signal, is no longer supplied to the neural network 201. The other analog input signals $I_2$ to $I_N$ are continuously supplied to the neural network 201. In this case, it is desirable that the inputs of the amplifiers incorporated in the neural network 201 be connected to the ground.

Upon lapse of a predetermined time, the neural network 201 goes into a steady state again. Then, the output of the amplifier supplied with the analog input signal having the second greatest current value rises to the logic "1" level. The sense circuit 202 detects the number of this output and supplies data representing the number to the control circuit 203. The control circuit 203 input this data to the memory circuit 205. The memory circuit 205 stores the data, in the storage area for the second greatest analog input signal. Meanwhile, the control circuit 203 outputs an exclusion command to the exclusion circuit 204, for opening the switch assigned to the input signal having the second greatest current value. In response to the exclusion command, the circuit 204 opens the switch assigned to the input signal having the second greatest current value. As a result, the second greatest analog input signal, is no longer supplied to the neural network 201. The other analog input signals are continuously supplied to the neural network 201.

The operations described in the preceding two paragraphs are repeated under the control of the control circuit 203 until all analog input signal $I_1$ to $I_N$ are placed in descending order. More precisely, the system shown in FIG. 11 repeats these operations $N-1$ times, thereby determining the descending order of the analog input signals in terms of their magnitudes. Hence, the analog input signals can be easily selected in accordance with their magnitudes and used as control values.

Instead of using the exclusion circuit 204, the output of each amplifier can be clamped to achieve the same advantage as is attained by using the exclusion circuit 204. In other words, the supply of analog input signals to the neural network 201 can be stopped. It is not always necessary to place all analog input signals in descending order.

A modification of the system illustrated in FIG. 11 will now be described, with reference to FIG. 12. In FIG. 12, the same numerals designate the same components as those shown in FIG. 11.

In the system illustrated in FIG. 12, analog input signals $I_1$ to $I_N$ are supplied to a first neural network 201, to an inverting circuit 206 and a signal processing circuit 208. The inverting circuit 206 comprises an operational amplifier or the like, and inverts the polarity of an input signal. Hence, the inverting circuit 206 serves to invert the order in which the analog input signals have been placed in terms of their magnitudes.

The signal output from the first neural network 201 is input to a first sense circuit 202. The output of the inverting circuit 206 is supplied to a second neural network 211 which performs the same function as the first neural network 201. The output of the second neural network 211 is input to a second sense circuit 212 which performs the same function as the first sense circuit 202.

The first neural network 201 has a plurality of amplifiers. One of these amplifiers, which has received the analog input signal at a higher level than any other analog signal input to the first neural network 201, outputs a signal at logic "1" level. The first sense circuit 202 detects this output, thereby determining the number of the maximum analog input signal.

In the meantime, the analog input signals $I_1$ to $I_N$, whose polarities have been inverted by the inverting circuit 206, are supplied to the second neural network 211. The second neural network 211 also has a plurality of amplifiers. One of these amplifiers, which has received the analog input signal at a higher level than any other analog signal supplied from the inverting circuit 206, outputs a signal at logic "1" level. The second sense circuit 212 detects this output, thereby determining the number of the minimum analog input signal.

The outputs of the first and second sense circuits 202 and 212 are supplied to the signal processing circuit 208.

The levels of the analog input signals which the sense circuits 202 and 212 have determined to be maximum and minimum, respectively, are compared with a reference level in the signal processing circuit 208, whereby the upper and lower limits of control values can be checked within a short period of time. Usually it is quite probable that a signal at the highest or lowest level is an incorrect one, unlike many other signals. In view of this, the system shown in FIG. 12 is useful in obtaining a control value which is the average level of all analog input signals, except the highest-level signal and the lowest-level signal.

The inverting circuit 206 can be replaced by a circuit which inverts the polarity of an analog input signal and then applies a bias to the inverted signal, thereby converting the analog input signal into a signal at a level which corresponds to a complement of a specific signal-level range. If this is the case, the second sense circuit 212 can detect the minimum analog input signal, i.e., the analog signal at the lowest level.

The control circuit 203 and the memory circuit 205, both shown in FIG. 11, can be incorporated into the data-processing system illustrated in FIG. 12.

Another modification of the system shown in FIG. 11 will now be described, with reference to FIG. 13. In FIG. 13, the same numerals denote the same components as those illustrated in FIGS. 11 and 12.

The system shown in FIG. 13 has a switch circuit 207 for switching the analog input signals $I_1$ to $I_N$ and the inverted analog input signals supplied from an inverting circuit 206. The circuit 207 comprises, for example, a plurality of switches which operate in an interlocked fashion. The outputs of the switch circuit 207 are supplied to a neural network 201 having inhibitory synaptic connections. The outputs of the neural network 201 are input to a sense circuit 202. The sense circuit 202 is designed to determine which output of the network 202 is at logic "1" level. A control circuit 213 is connected to the control terminal of the switch circuit 207 and also to the output terminal of the sense circuit 202. A memory circuit 215 is connected to the output of the control circuit 213.

The analog input signals $I_1$ to $I_N$ are supplied not only to the switch circuit 207, but also to an inverting circuit 206. The inverting circuit 206 inverts the polarities of the analog input signals. The output signals of the inverting circuit 206 are input to the switch circuit 207.

When the system is in an initialized state, the switch circuit 207 selects the analog input signals $I_1$ to $I_N$, and supplies them to the neural network 201. One of the amplifiers incorporated in the network 201, which has received the signal at a higher level than any other signal, outputs a signal at logic "1" level. The sense circuit 202 detects this output signal, and supplies data representing the serial number of the highest-level input signal. This data is input to the control circuit 213. The control circuit 213 supplies the data to the memory circuit 215. The circuit 215 stores this data in the storage area for the maximum analog input signal upon receipt of the output data from the sense circuit 202, the control circuit 213 outputs a switching command to the switch circuit 207. In response to the switching command, the circuit 207 selects the signals output from the inverting circuit 206, and supplies these signals to the neural network 201. In the network 201, the amplifier which has received the signal at the highest level (i.e., the analog input signal at the lowest level) outputs a signal at the logic "1" level, whereas all other amplifiers output signals at logic "0" level. The signals output by the amplifiers are input to the sense circuit 202. The sense circuit 202 detects the signal at the logic "1" level, and outputs data representing the number of the minimum analog input signal (i.e., the analog input signal at the lowest level). This data is supplied to the control circuit 213. The circuit 213 supplies the data to the memory circuit 215. The memory circuit 215 stores the data in the storage area for the minimum analog input signal. The memory circuit 215 outputs two data items representing the numbers of the maximum and minimum analog input signals, whenever necessary.

The data-processing system shown in FIG. 13 requires twice as much time as the system illustrated in FIG. 12, in order to process the analog input signals, but is advantageous since it needs only one neural network. The inverting circuit 206 can be replaced by a circuit which converts the analog input signals to complement signals, as in the second embodiment shown in FIG. 11. Further, the exclusion circuit 204 (FIG. 11) can be incorporated into the system shown in FIG. 13, so that the neural network 201, the sense circuit 202, and the control circuit 213 perform their respective functions repeatedly.

A third modification of the system shown in FIG. 11 will now be described, with reference to FIG. 14.

As is evident from FIG. 14, this modification comprises a determining circuit 208 for detecting, from among analog input signals, the highest-level signal and the lowest-level signal, an averaging circuit 209 for finding the average level of all analog signals input to it, and an exclusion circuit 214 for preventing the highest-level signal and the lowest-level signal, both detected by the determining circuit, from being input to the averaging circuit 209. The determining circuit 208 is substantially identical in structure to that shown in FIGS. 12 and 13. The averaging circuit 209 comprises an N-input adder and an amplifier for amplifying the output of the adder, $1/(N-2)$ times. The exclusion circuit 214 comprises a plurality of switches and a control circuit for controlling the switches. Any switch turned on allows the passage of an analog input signal, and any switch turned off opens that input terminal of the averaging circuit which is connected to the switch.

The operation of the system illustrated in FIG. 14 will be explained. The determining circuit 208 outputs the data representing the number of the analog input signal at the highest and lowest levels of all analog input signals $I_1$ to $I_N$. The data is input to the exclusion circuit 214, thereby specifying the highest-level and lowest level analog input signals. In response to this data, the exclusion circuit 214 prevents the supply of the highest-level signal and the lowest-level signal, to the averaging circuit 209. The circuit 209 finds the average level of all analog signals supplied to it. Assuming that the determining circuit 208 has determined that the analog input signals $I_1$ and $I_N$ are at the highest level and the lowest level, respectively, the averaging circuit 209 obtains the average level of the analog input signals $I_3$ to $I_N$. The circuit 209 outputs the data showing the average level.

As has been pointed out, the determining circuit 208 detects the highest-level signal and the lowest-level signal. Alternatively, the circuit 208 can be designed to detect only the highest-level signal or the lowest-level signal. In this case, the averaging circuit 209 finds the average level of all analog input signals, except for the highest-level signal or the lowest-level signal.

As can be understood from the above description, the system illustrated in FIG. 14 produces an average level of all analog signals input to it, except for the highest-level signal and/or the lowest-level signal which are incorrect ones in most cases. The data representing the average level can, therefore, be used as a reliable control value.

A fourth modification of the system shown in FIG. 11 will now be described, with reference to FIG. 15. In FIG. 15, the same numerals designate the same components as those illustrated in FIGS. 11 to 14.

In the fourth modification, analog input signals $I_1$ to $I_N$ are supplied to a multiplying circuit 210 and a complement generating circuit 216. The circuit 216 converts each input signal to a complement signal representing the the upper and lower limits of a specified level range. The multiplying circuit 210 multiplies each complement signal output from the circuit 216 by the corresponding analog input signal. The signals output by the multiplying circuit 210 are input to a neural network 201 having inhibitory synaptic connections. The output signals of the neural network 201, i.e., the outputs of the amplifiers in the network 201, are supplied to a sense circuit 202. The sense circuit 202 determines which amplifier has output a signal at logic "1" level.

The complement generating circuit 216 inverts the polarities of the analog input signals, and applies an upper-limit bias and a lower-limit bias to each inverted signal, thereby generating a complement signal showing the upper and lower limits of the specified level range. This signal conversion is performed by, for example, an operational amplifier used in the circuit 216.

The signal at the highest level of all signals output by the multiplying circuit 210 is the product of the analog input signal at a level most similar to the intermediate level of the specified level range. Hence, the data output from the circuit 202 represents the number of the analog input signal at the level most similar to the intermediate level.

When the intermediate level of the specified range corresponds to a desired control value, the sense circuit 202 detects the analog input signal which is equivalent to a control value most close to the desired control value.

Figure 16:
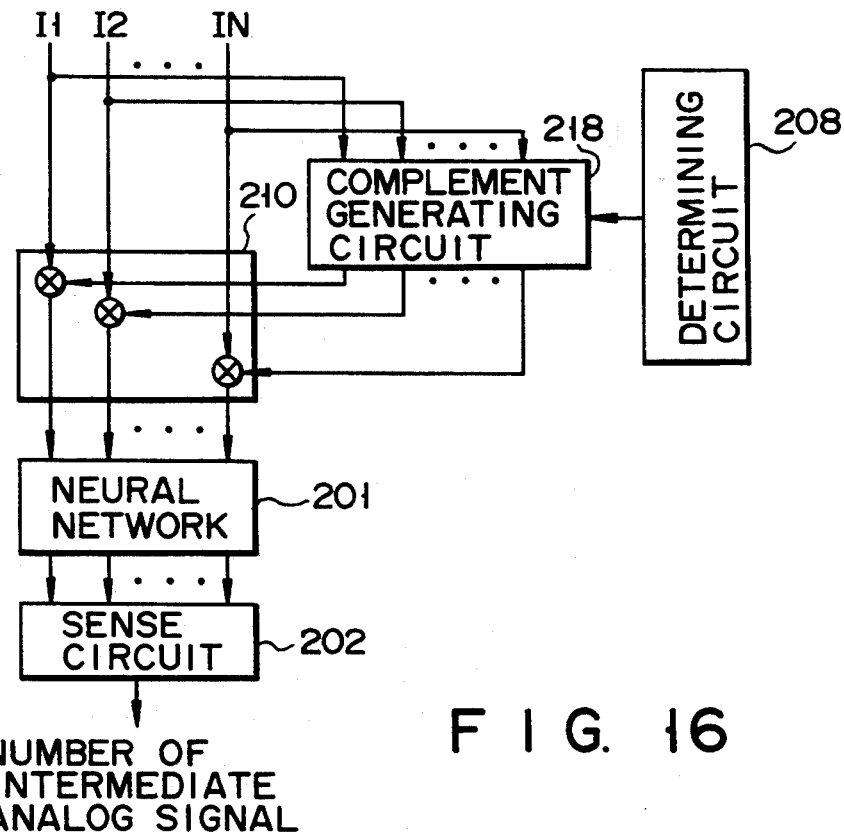
FIG. 16 is a block diagram showing a system according to the invention, which is designed to detect the signal at the level most similar to halfway between the highest-level signal and the lowest-level signal input to the system.

A fifth modification of the system shown in FIG. 11 will now be described, with reference to FIG. 16. In FIG. 16, the same numerals represent the same components as those illustrated in FIGS. 11 to 15.

The fifth modification is characterized in two respects. Firstly, it is a combination of the system shown in FIG. 15 and the determining circuit 208 (FIG. 14). Secondly, the complement generating circuit 216 (FIG. 15) is replaced by another type of a complement generating circuit 218 which utilizes the levels of the highest-level and lowest-level analog input signals as the upper and lower limits of a specified level range.

The operation of the system illustrated in FIG. 16 will be explained. The determining circuit 208 determines which signals are at the highest and lowest levels of all analog input signals $I_1$ to $I_N$, and supplies the numbers of the highest-level signal and the lowest-level signal to the complement generating circuit 218. The complement circuit 218 uses the input signals of the numbers as the upper and lower limits of the specified range, respectively. Therefore, the circuit 218 converts the analog input signals $I_1$ to $I_N$ into complement signals over the specified range. The intermediate level of this range is exactly half way between the levels of the highest-level and lowest-level analog input signals. Therefore, the data output by the sense circuit 202 represents the number of the analog input signal at the level most similar to the intermediate level of the specified range.

The complement generating circuit 218 comprises, for example, a switch circuit for selecting the analog input signals detected by the determining circuit 208, and an operational amplifier for obtaining the complements to all analog input signals in accordance with the levels of the signals selected by the switch circuit.

The determining circuit 208 can be re-designed to select the highest-level signal and the lowest-level signal, and supply these signals to the complement generating circuit 218. In this case, the circuit 218 can be of the same structure as its equivalent shown in FIG. 15. Also, the determining circuit 208 can be redesigned to supply the complement generating circuit 216 with the average level of all analog input signals or the average level output by the averaging circuit 209, instead of the level of the highest-level signal or the lowest-level signal. In this case, the sensing circuit 202 will output the data representing the number of the analog input signal at the level most similar to the average level.

Figure 17:
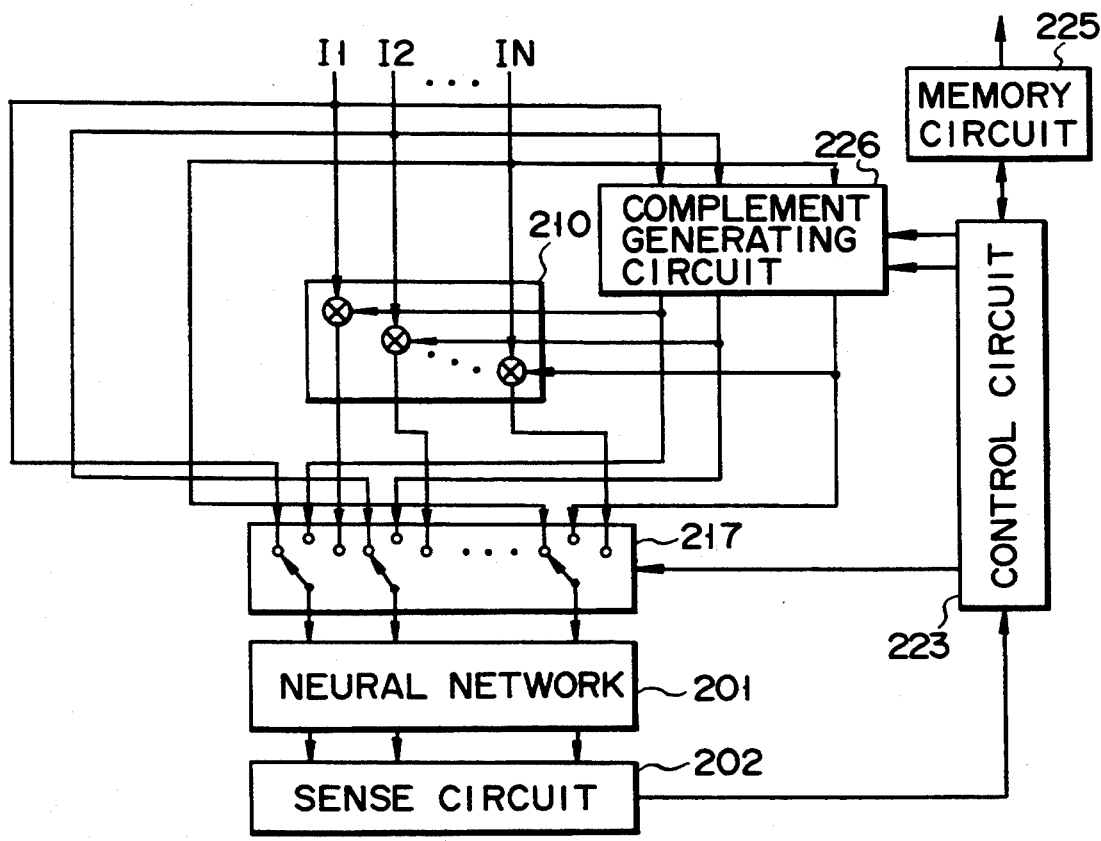
FIG. 17 is a block diagram illustrating another system according to the invention, which is designed to detect, from among the input signals, the highest-level signal, the lowest-level signal, and the signal at the level most similar to halfway between the highest and lowest levels.

A sixth modification of the system shown in FIG. 11 will now be described, with reference to FIG. 17. In FIG. 17, the same numerals designate the same components as those shown in FIGS. 11 to 16.

In the sixth modification, analog input signals $I_1$ to $I_N$ are supplied to a complement generating circuit 226, a multiplying circuit 210, and a switching circuit 217. The complement generating circuit 226 inverts the polarities of the analog input signals, applies biases corresponding to the levels of the highest-level and lowest-level signals, to any other analog input signal, and converts the analog input signals into complement signals. The complement signals are input to the multiplying circuit 210. The multiplying circuit 210 multiplies each analog input signal by the corresponding complement signal. The signals output by the circuit 210 are input to the switching circuit 217, along with the analog input signals $I_1$ to $I_N$ and the complement signals. The switching circuit 217 selects the signals of one of the three types, that is, the analog input signals, the complement signals, or the output signals of the multiplying circuit 210, and supplies the signals, thus selected, to the neural network 201 having inhibitory synaptic connections. The signals output by the neural network 201 are input to a sense circuit 202. The complement generating circuit 226, the switching circuit 217, and the sense circuit 202 are connected to a control circuit 223. The control circuit 223 receives the data items representing the numbers of the highest-level signal, the lowest-level signal, and the intermediate-level signal, and supplies these data items to the complement generating circuit 226 and a memory circuit 225. Also, the control circuit 223 supplies a switching command to the switching circuit 217 and the complement generating circuit 226. The memory circuit 225 stores the numbers of the highest-level signal, the lowest-level signal, and the intermediate-level signal in the storage areas assigned to these numbers. When necessary, these numbers are read from the memory circuit 225 and used as control values.

The operation of the data-processing system shown in FIG. 17 will be explained, with reference to the flow chart shown in FIG. 18. First, the control circuit 223 outputs a switching command to the switching circuit 17, whereby the circuit 217 selects the analog input signals $I_1$ to $I_N$ and supplies these signals to the neural network 201 (Step T1).

The neural network 201 processes the analog input signals. Upon lapse of a predetermined time, the amplifier which has received the highest-level signal outputs a signal at logic "1" level. The sense circuit 202 detects the signal at the logic "1" level. In other words, the sense circuit 202 determines the number of the highest-level analog input signal. The sense circuit 202 outputs the data showing this number, to the control circuit 223. The control circuit 223 supplies the data to the memory circuit 225, whereby the data is stored in the storage area assigned to the highest-level analog input signal (Step T3).

Next, the control circuit 223 supplies a switching command to the complement generating circuit 226, so that the circuit 226 inverts the polarities of the analog input signals (Step T4). The control circuit 223 supplies the switching command to the switching circuit 217, too, so that the circuit 217 supplies the complement signals are supplied to the neural network 201 (Step T5). The neural network 201 processes the complement signals. Upon lapse of the predetermined time, the amplifier which has received the lowest-level signal outputs a signal at the logic "1" level (Step T6). The sense circuit 202 detects the signal at the logic "1" level. In other words, the sense circuit 202 determines the number of the lowest-level analog input signal. The sense circuit 202 outputs the data showing this number, to the control circuit 223. The control circuit 223 supplies the data to the memory circuit 225, whereby the data is stored in the storage area assigned to the lowest-level analog input signal (Step T7).

The control circuit 223 supplies the data items showing the numbers of the highest-level and lowest-level signals, and also a switching command, to the complement generating circuit 226 (Step T8). In response to the switching command, the circuit 226 inverts the polarities of the analog input signals, and applies the biases corresponding to the levels of the highest-level and lowest-level signals to the polarity-inverted analog input signals. As a result, the circuit 226 converts the analog input signals $I_1$ to $I_N$ to complement signals at various levels ranging from the level of the highest-level signal to that of the lowest-level signal. Meanwhile, the control circuit 223 supplies the switching command to the switching circuit 217, so that the signals output by the multiplying circuit 210 can be supplied to the neural network 201 (Step T9). The neural network 201 processes the analog input signals in accordance with the output signals of the multiplying circuit 210. Upon lapse of the predetermined time, the sense circuit 202 detects the number of the analog input signal at the level most similar to the level exactly half way between those of the highest-level and lowest-level signals (Step T10). The sense circuit 202 outputs the data item showing the number of the signal, to the control circuit 223. The control circuit 223 supplies the data item to the memory circuit 225. The memory circuit 225 stores this data item in the storage area assigned to the intermediate-level signal. When necessary, the memory circuit 225 reads the data items representing the numbers of the highest-level signal, the lowest-level signal, and the signal at the level most similar to the intermediate level. These data items are used as control values.

The data-processing system shown in FIG. 17 can determine which analog input signals are at the highest level, the lowest level, and the level most similar to the intermediate level, though the system has only one neural network.

A seventh modification of the system illustrated in FIG. 11 will now be described, with reference to FIG. 19. In FIG. 19, the same numerals denote the same components as those shown in FIGS. 11 to 17.

In the seventh modification, analog input signals $I_1$ to $I_N$ are supplied to a complement generating circuit 236 and a multiplying circuit 210. The circuit 236 converts the analog input signals to complement signals, and inputs the complement signals to the multiplying circuit 210. The multiplying circuit 210 multiplies each analog input signal by the corresponding complement signal. The signals output by the multiplying circuit 210 are input to an exclusion circuit 224. The exclusion circuit 224 supplies all input signals to a neural network 201, except the signals whose numbers have been specified by the control circuit 233. The signals output by the neural network 201 are supplied to a sense circuit 202. The signal output by the sense circuit 202 is input to the control circuit 233.

The analog input signals $I_1$ to $I_N$ are also supplied to a selection circuit 234. The selection circuit 234 allows the passage of only the analog input signals whose numbers have been specified by the control circuit 233. The signal output by the selection circuit 234 are input to an averaging circuit 209. The circuit 209 finds the average level of the signals output from the selection circuit 234.

The operation of the system shown in FIG. 19 will now be explained. In the initialized state of the system, the exclusion circuit 224 allows the passage of all analog input signals to the neural network 201, whereas the selection circuit 234 prevents all analog input signals from being supplied to the averaging circuit 209. Under this condition, the complement generating circuit 236 outputs complement signals corresponding to all analog input signals. The multiplying circuit 210 outputs signals, each being the product of an analog input signal and the complement signal corresponding thereto.

In the neural network 201, the amplifier, which has received the signal at a level most similar to the intermediate level of the level range set to the neural network 201, outputs a signal at the logic "1" level. The sense circuit 202 detects this signal, and produces the data representing the number of the signal at the level most similar to the intermediate one. This data is input to the control circuit 233. In response to the data, the control circuit 233 supplies an exclusion command to the exclusion circuit 224 so that the circuit 224 prohibits the passage of the intermediate-level signal, and supplies a selection command to the selection circuit 234 so that the circuit 234 allows the passage of the intermediate-level signal. The neural network 201 detects the analog input signal at the level second closest to the intermediate one, and outputs the data showing the number of this analog input signal to the control circuit 233. In response to this data, the control circuit 233 supplies an exclusion command and a selection signal to the exclusion circuit 224 and the selection circuit 234, respectively. In response to the exclusion signal, the circuit 224 prohibits the passage of the analog input signal at the level second closest to the intermediate level. In response to the selection command, the circuit 234 allows the passage of the analog input signal to the averaging circuit 209.

The neural network 201, the sense circuit 202, the control circuit 233, the exclusion circuit 224, and the selection circuit 234 perform the operations described in the preceding paragraph, thereby supplying some other analog input signals at levels similar to the intermediate level, to the averaging circuit 209. The circuit 209 finds the average level of these analog input signals, and outputs a signal representing the average level. This data is output from the data-processing system and is used as a control value.

The "intermediate level" is, in the case of the system of FIG. 19, is exactly the intermediate level of a specified range when the complement generating circuit 236 is designed to converts the analog input signals to values complement to the specified range. Also, the "intermediate level" is the level exactly half way between the levels of the highest-level and lowest-level analog input signals when the complement generating circuit is designed to convert the analog input signals to values complement of the range between the level of the lowest-level signal and the level of the highest-level signal.

It will now be described how the data-processing system according to the second embodiment is used to control a plant, with reference to FIG. 20.

FIG. 20 illustrates a gas turbine. The gas turbine has a plurality of burners 241. Fuel is supplied to these burners 241 through a fuel-supplying pipe 243. A valve 242 is connected on the pipe 243, for controlling the supply of fuel to the burners 241. A plurality of temperature sensors SE is located within the gas turbine. The electrical signals output by the sensors SE are supplied to a signal-processing circuit 244 which is either the system shown in FIG. 14 or the system shown in FIG. 19. The circuit 244 outputs a signal representing the average level of all output signals of the sensors SE, except the highest-level signal and the lowest-level signal, or the average level of those of the signals which are at levels close to the intermediate level. The output signal of the circuit 244 represents the average temperature within the gas turbine. The output signal of the circuit 244 is input to a control circuit 245. The control circuit 245 performs a PID control of the type generally known in the art, in accordance with the signal output from the signal-processing circuit 244, thereby changing the opening of the valve 242 and, thus, controlling the temperature inside the turbine.

The temperature distribution within the turbine is not uniform. In other words, the temperature differs from one location to another, and this is why a plurality of temperature sensors SE are located within the turbine, the average temperature being determined from the signals output by these sensors. Since the sensors SE are continuously exposed to intense heat, they are prone to malfunction, each outputting a signal representing a temperature higher or lower than the actual value. This is why the control circuit 245 uses, as control value, the average level of only those of the signals output by the sensors SE which are at levels similar to the intermediate level. Hence, the control the circuit 245 performs is reliably. Further, since the signal-processing circuit 244 has only one neural network, it operates at a sufficiently high speed, and helps the control circuit 245 to perform an on-line control.

The second embodiment of the invention can process not only current signals $I_1$ to $I_N$, but also voltage signals. The neural network 201, which is an analog circuit, can be replaced by a digital operation circuit. In this case, the analog input signals are converted to digital signals by means of an A/D converter, the digital operation circuit processes the digital signals in accordance with a difference equation equivalent to the differential equation (10).

The amplifiers incorporated in the neural network 201 are not limited to the type having the characteristic shown in FIG. 2. For example, the maximum saturation value of each amplifier need not be "1". When the network 201 comprises amplifiers whose maximum saturation value is other than "1", the sense circuit must be of the type which detects this saturation value. Alternatively, the neural network 201 can comprise amplifiers of simple increase-function characteristics. If this is the case, the sense circuit 202 must be of the type which detects the output of the amplifiers when these outputs reach a predetermined value.

The second embodiment of the present invention makes an effective use of the parallel processing performed by the neural network, thereby instantaneously detecting the highest-level signal, the lowest-level signal, and the intermediate-level signal, and also placing the analog input signals in descending order in accordance with their magnitudes. The second embodiment can therefore output, without a delay a reliable control value, i.e., the average level of only those of the analog input signals, which are at levels close to the intermediate level.

Moreover, to achieve an alarm processing, the second embodiment of the invention need not check every analog input signal to see whether or not the signal is at a level falling outside a specific range. Rather, it is sufficient for the embodiment to determine whether or not the highest-level signal is at a level higher than an upper limit and whether or not the lowest-level signal is a level lower than a lower limit.

The present invention is not limited to the second embodiment described above. For instance, a neural network designed to detect the lowest-level signal can be used in stead of the neural network 201 which detects the highest-level signal. If this is the case, the data-processing system shown in FIG. 11 will detect the lowest-level signal and place the analog input signals in ascending order, the systems illustrated in FIGS. 12 and 13 will detect both the highest-level signal and the lowest-level signal, and the system shown in FIG. 16 will detect the intermediate-level signal. Furthermore, a neural network designed to detect the intermediate-level signal can be used. In this case, the system shown in FIG. 11 will first detect the intermediate-level signal, then the signal at a level most similar to the intermediate level, next the signal at a level second most similar to the intermediate level, and so forth, and an average level of the signals thus detected can be be a greatly reliable control signal.

Third Embodiment

The neural network according to a third embodiment of the invention, and the data-processing system comprising this neural network, will now be described.

The artificial neurons used in the neural network according to the third embodiment will be first explained. Each neuron receives an input signal I, a bias signal J, and a signal xi ωi, where xi is the output of another neuron, and ωi is the synaptic connection coefficient of the other neuron. The neuron adds these input signals, and produces the internal condition u(t) of the neuron according to Equation (16). If the neuron has an inhibitory synaptic connection, the coefficient ωi has a negative value. When it is impossible, from a physical point of view, that the coefficient has a negative value, the output xi of the neuron is inverted, and the coefficient ωi is multiplied by the inverted output −xi.

$$\tau \frac{du(t)}{dt} = -u(t) + \Sigma \omega i \, xi \, (t) + I + J \qquad (16)$$

where $\tau$ is the time constant of the artificial neuron.

The artificial neuron converts the signal u(t) into an output x(t), by using output function f, as can be understood from the following equation:

$$x(t) = f[u(t), h] \qquad (17)$$

The output function is, for example, the sigmoid function defined in FIG. 2. When the threshold value h is not on the right side, as in the case of Equation (15), it is a parameter of the output function f.

Therefore, the readiness of sparking of the artificial neuron can be altered by changing the value of the bias signal J, the form of the output function f, or the synaptic connection coefficient ω.

The artificial neuron can be an analog circuit comprising amplifiers. More specifically, it can be the analog circuit illustrated in FIG. 1, FIG. 8, or FIG. 10. Alternatively, the artificial neuron can be an optimal system having spatial modulation elements. Further, it can be a digital operation circuit, in which case Equation (16) must be transformed to a difference equation.

The third embodiment of the present invention, which is a neural network, will be described with reference to FIG. 21. This neural network is an electric circuit designed to place input signals in descending or ascending order, in accordance with their levels.

As is illustrated in FIG. 21, the neural network comprises artificial neurons 311 arranged in rows and columns. Each neuron has inhibitory synaptic connections with the other neurons of the same row, and also with the other neurons of the same column. An input-signal supplying circuit 308 is connected to the neural network 301. The circuit 308 supplies input signals I1 to I2, ... IM to the columns of neurons, respectively. A bias-signal supplying circuit 309 is also connected to the neural network 301. The circuit 309 supplies bias signals J1, J2, ... JM to the rows of neurons, respectively. The bias signal J1 is at a level higher than the bias signal J2, which in turn is at a level higher than the bias signal J3, and so forth. The signals output from the artificial neurons 311 are input to a determining circuit 310.

The operation of the system shown in FIG. 21 will be explained.

The bias signal J1 supplied to the neurons 311 of the first row is at a level higher than those supplied to the neurons 311 of the other rows. Thus, as for the neurons 311 of the first row, the right side of Equation (16) is great. In the right side, u(t) is likely to be particularly great. Obviously, the neurons 311 of the first row are more likely to spark, than the neurons of any other row. The neurons of the second row are more likely to spark than those of the third row, which in turn are more likely to spark than those of the fourth, and so forth. In other words, the artificial neurons 311 are divided into hierarchial groups. The neurons 311 of the first hierarchial group are most likely to spark, and those of the last hierarchial group are least likely to spark.

When the circuit 308 supplies the signals I1, I2, I3, ... IM are to the neural network 301, the neuron network 301 operates in the following way.

First, the neuron 311 of the first row, which receives the signal at a level higher than any other signal sparks since the term I+J in the right side of Equation (16) has a greater value for this neuron than for any other neuron. This neuron outputs signal x at logic "1" level. As a result, it is determined which input signal is at the highest level. The output signal of the igniting neuron 311 is supplied to the other neurons of the same row, and also to the other neurons of the same column. Since the artificial neurons 311 are combined by inhibitory synaptic connections, they have a synaptic connection coefficient $\omega$ of a negative value. Thus, the value of the second term, $\Sigma \omega_i x_i(t)$, on the right side of Equation (16) decreases for the other neurons of the same row and the other neurons of the same column. Hence, these neurons are inhibited from sparking and operate stably.

Then, the value I+J of that neuron 311 of the second row, which has received the signal at the second highest level, increases until this neuron sparks. When this neuron sparks, it outputs a signal at the logic "1" level. The input signal at the second highest level is detected from the signal at the logic "1" level. The output of the neuron, which has just sparked, is supplied to the other neurons of the same row, and also to the other neurons of the same column. These neurons are inhibited from igniting, and operate stably.

Next, the value I+J of that neuron 311 of the third row, which has received the signal at the third highest level, increases until this neuron sparks. When this neuron sparks, it outputs a signal at the logic "1" level. The input signal at the third highest level is determined from the signal at the logic "1" level. The output of the neuron, which has just sparked, is supplied to the other neurons of the same row, and also to the other neurons of the same column. These neurons are inhibited from igniting, and operate stably.

As can be understood from the three preceding paragraphs, within a predetermined time after the supply of the signals I1, I2, I3, ... IM to the network 301, one neuron of each row sparks. The signals output by the neurons, which has sparked, are supplied to the determining circuit 310. The circuit 310 determines the levels the input signals I1 to IM and places these signals in descending order in accordance with their levels. More specifically, if the neuron 311 of the first row and the first column sparks, the circuit 310 determines that the input signal I1 is at the highest level; if the neuron of the second row and the second column is sparked, the circuit 310 determines that the input signal I2 is at the second highest level. The circuit 310 determines the levels of all input signals, and places them in descending order in accordance with their levels, within a sufficiently short period of time.

The input-signal supplying circuit 308 comprises a plurality of current sources for supplying currents of different values, i.e., the input signals I1 to IM. The determining circuit 310 is a computer or the like.

FIG. 22 is a circuit diagram illustrating a part of the neural network 301, in greater detail. This part of the network 310 comprises artificial neurons arranged in two rows and three columns. As is shown in FIG. 22, the neurons are analog amplifiers, and the synapses incorporated in the network 301 are resistors. When the resistances of these resistors are changed, the synaptic connection coefficients $\omega$ vary. The inverted output of each amplifier is supplied to the other amplifiers of the same row and the same column through the resistors, whereby inhibitory synaptic connections are formed.

It will now be explained how the circuit shown in FIG. 21 operates to control the gas turbine shown in FIG. 20, when the circuit is used as signal-processing circuit 244.

The signal-processing circuit 244 has an averaging circuit (not shown in FIG. 21). The averaging circuit receives the signal output from the determining circuit 310 and the signals output from the temperature sensors SE located in the gas turbine. The averaging circuit finds the average level of the all signals supplied from the sensors SE, except the highest-level and lowest-level signals, or the average level of some of the signals at levels similar to the intermediate level, in accordance with the output signal of the determining circuit 310. The averaging circuit outputs a signal representing the average level, to the control circuit 245. More precisely, this signal represents the average temperature within the gas turbine. In response to the signal output from the circuit 244, the control circuit 245 performs a control (e.g., a PID control), thus adjusting the opening of the valve 242 and, ultimately, control the temperature in the turbine.

The third embodiment of the present invention makes an effective use of the parallel processing performed by the neural network by instantaneously detecting an order of input signals in accordance with their signal levels. Hence, the third embodiment can instantaneously detect the highest-level signal, the lowest-level signal, and the intermediate-level signal. The third embodiment can therefore output, without a delay, a reliable control value, i.e., the average level of only those of the analog input signals, which are at levels close to the intermediate level.

Moreover, to achieve an alarm processing, the third embodiment of the invention need not check every analog input signal to see whether or not the signal is at a level falling outside a specific range. Rather, it is sufficient for the embodiment to determine whether or not the highest-level signal is at a level higher than an upper limit and whether or not the lowest-level signal is a level lower than a lower limit.

A modification of the circuit illustrated in FIG. 21 will now be described, with reference to FIG. 23. This modification comprises a neural network 302. The neural network 302 has artificial neurons 312 arranged in rows and columns. The bias signals supplied to the neurons 312 are at "0" level, or a predetermined level. Each artificial neuron 312 forms inhibitory synaptic connections with the other neurons of the same row, and also with the other neurons of the same column. The neurons 312 of the first row have an inhibitory connection coefficient $\omega 1$ greater than those $\omega 2$ to $\omega M$ of the neurons of the other rows. (Since the coefficients $\omega 1$ to $\omega M$ are negative numbers, $\omega 1$ has the least absolute value, and represents the least degree of inhibition.) The coefficient $\omega 2$ of the neurons of the second row is greater than that (i.e., $\omega 3$) of the neurons of the third row, which in turn is greater than that (i.e., $\omega 4$) of the neurons of the fourth row, and so forth. An input-signal supplying circuit 308, which is identical to the circuit 308 shown in FIG. 21, is connected to the neural network 302. A determining circuit (not shown), which is identical to the circuit 310, is connected to the neural network 302.

Assuming that the term xi (t) in Equation (17) has the same value for all rows of artificial neurons 312, the second term $\Sigma \omega i \, xi \, (t)$ on the right side of Equation (16) has the greatest value (i.e., the least absolute value) for the artificial neurons of the first row. Therefore, the neurons of the first row are more likely to spark than the neurons of any other row. The neurons of the second row are more likely to spark than those of the third row, which in turn more likely to spark than those of the fourth row, and so forth. Hence, the circuit shown in FIG. 23 can instantaneously detects the order of the input signals in accordance with their signal levels.

It is possible to assign the least threshold value h to the neurons of the first row, the second least threshold value h to those of the second row, the third least threshold value h to those of the third row, and so forth. Also in this case, the circuit shown in FIG. 23 can instantaneously detects the order of the input signals in accordance with their signal levels.

Further, different output functions can be assigned to the rows of artificial neurons, such that the neurons of the first row are most likely to spark, as is indicated by the solid-line curve in FIG. 2, those of the second row are less likely to spark, as is indicated by the broken-line curve in FIG. 2, those of the third row are still less likely to spark, and so forth. In this case, too, the circuit shown in FIG. 23 can instantaneously place the input signals in descending order in accordance with their levels.

A second modification of the circuit shown in FIG. 21 will now be described, with reference to FIG. 24.

The neural network of this circuit also has artificial neurons 313 which are arranged in rows and columns. They are connected by means of synaptic connections (not necessarily be inhibitory ones). The neurons 313 are divided into hierarchial groups such that the neurons having the same value of $i+j$ form one hierarchial group, where i and j are integers representing the serial number of any row and the that of any column, respectively. The more the value of $i+j$ the neurons have, the less likely they are to spark. (The threshold value hij is adjusted for the neurons of each hierarchial group, such that the neurons are more or less likely to spark than those of any other group.)

A input/bias supplying circuit 304 is connected to the input terminals of the artificial neurons 313. The circuit 304 supplies an input signal Iij and a bias signal Jij to each neuron. A check circuit 305 is connected to the outputs of the neurons 313, for determining whether the solution found by the neural network 303 is reasonable or not. A parameter-setting circuit 306 is connected to the neurons 313 and also to the input/bias supplying circuit 304. The circuit 306 alters the parameters of the neural network 303, i.e., input signals I, bias signals J, connecting coefficients $\omega$, and threshold values h, when the solution obtained by the network 303 is not reasonable. A control circuit 307 is connected to the network 303, the check circuit 305, and the parameter-setting circuit 306, for controlling these components.

The operation of the neural network system shown in FIG. 24 will be explained. For simplicity, it will be described how the system determines the order in which different products should be manufactured, lot by lot, at a minimum cost of preparation for manufacturing one lot after producing another lot.

First, lots of products are assigned to the rows of the neurons 313, and the priorities of the lots in terms of the order of manufacturing the products are assigned to the columns of the neurons 313. Hence, the sparking of the neuron of the i-th row and the j-th column means that the lot assigned to the i-th row must be manufactured after the (j−1)th lot.

The solution to the optimization problem, which the neural network system aims to find, reduces the following energy function E to a minimum:

$$E = (A/2) \cdot \sum_X \sum_k \sum_{l \neq k} VXk \, VXl + \qquad (18)$$
$$(B/2) \cdot \sum_k \sum_x \sum_{X \neq Y} VXk \, VYl + (C/2) \cdot \left( \sum_X \sum_k VXk - n \right)^2 +$$
$$(D/2) \cdot \sum_X \sum_{Y \neq X} \sum_k dXY \, VXk \cdot (VY,k+1 + VY,k-1)$$

where VXk ($0 \leq VXk \leq 1$) is the output of the neuron which indicates that lot X must be manufactured after the (k−1) lot, dxy is the cost of preparation for producing the lot X after the lot Y, n is the number of lots which are to be manufactured, and A, B, C, and D are constants. The first, second, and third terms on the right side of Equation (18) have the following values in the following conditions. The first term is 0 when none or one of the neurons of each row has sparked. The second term is 0 when none or one of the neurons of each column has sparked. The third term is 0 when only n neurons of the network have sparked. The fourth term on the right side of Equation (18) represents the cost of preparation for manufacturing one lot after manufacturing another.

The neural network 303, which is a mutual connection type, continues a stable operation until the energy function E defined by Equation (3) becomes minimal. That is:

$$E = -(1/2) \sum_{Xk, Yl} \omega Xk, Yl\, VXk \cdot VYl - \sum_{Xk} (IXk + JXk)\, VXk + \sum_{Xk} \frac{1}{R \times k} \int_0^{V \times k} f^{-1}(V)\, dV \quad (19)$$

Therefore, the connection coefficient Xk of the neuron of X-th row and k-th column, and that $\omega Xk, Yl$ of the neuron of Y-th row and the first column are set at the following values:

$$\omega Xk, Yl = -A \cdot \delta XY(1 - \delta kl) - \quad (20)$$
$$B \cdot \delta kl(1 - \delta XY) - C - D \cdot dXY(\delta l, k + 1 + \delta l, k - 1)$$

where $\delta XY$ is Kronecher delta, which is given:

$$\delta XY \begin{cases} 1 : X = Y \\ 0 : X \neq Y \end{cases}$$

The signal IXk input to the neuron of X-th row and k-th column (i.e., the bias signal, JXk=0) is set at the following value:

$$IXk = cn \quad (21)$$

When the neural network 303, in which the connection coefficients and the input signal have been set at the above values, is operated, its energy function E reduces to a minimum. It is determined which neurons have been sparked at this time. From the sparking condition it is determined in which order the lots of products should be manufactured to minimize the cost of preparation for producing one lot after producing another lot.

For instance, if the neuron of the first row and the first column, the neuron of the second row and the third column, the neuron of the third row and the second column, and so on, spark while the neural network 303 is operating stably, it is determined that the lot A, the lot C, and the lot B should be manufactured in this order to minimize the cost of preparation for manufacturing one after manufacturing another lot.

Since the neuron 313 of i-th row and j-th column has a threshold value hij which is positively correlated to (I+J) but is different therefrom, the neurons of each hierarchial group have a sparking readiness different from that of the neurons of any other hierarchial group. Those artificial neurons, which are located in or along the diagonal joining the neuron of the first row and the first column and the neuron of M-th row and M-th column, are very likely to spark. In other words, as can be understood from FIG. 24, the higher priority a lot of products has, that is, the sooner this lot must be delivered to the customer, the more likely are they to be manufactured before the other lots of products. Hence, the neural network system shown in FIG. 24 can find a solution to the optimization problem of which lot of products should be manufactured before or after any other lot, in order not only to minimize the cost of preparation for producing one lot after producing another, but also to deliver the lot to the customer on the scheduled date.

As has been explained, the sparking readiness of each artificial neuron is changed by varying the threshold value of the neuron. Instead, the sparking readiness can be changed by altering the output function f of the neuron or the bias signal J supplied thereto. Further, the sparking readiness can be changed by applying different biases to the connection coefficients $\omega$ of the hierarchial groups of neurons, thereby adjusting the these connection coefficients $\omega$.

The check circuit 305 will now be described. As has been pointed out, the neural network system shown in FIG. 24 determines the order of manufacturing the lots of products in order not only to minimize the cost of preparation for manufacturing one lot after producing another, but also to deliver each lot of products to the customer by the deadline. However, it is not guaranteed that the order of manufacturing lots of products be determined such that the lot, which must be delivered on a specified date by all means, is delivered to the customer on that date. In order to prevent a delay in delivering any lot of products, the check circuit 305 determines, according to Equation (22), whether or not each lot of products can be manufactured on or before the date of delivery:

$$\sum_{i=0} [T\alpha(i-1, i) + T\beta(i)] \leq T\gamma(i) \quad (22)$$

In Equation (22), $T\alpha(i-1, i)$ is the time required to switch tools and apparatuses for producing the i-th lot, instead of the (i−1)th lot of products, $T\alpha(0,1)$ is the time required to arranging tools and apparatuses in preparation for producing the first lot, $T\beta(i)$ is the time required to manufacture the i-th lot, and $T\gamma(i)$ is the deadline for manufacturing the i-th lot of products. The circuit 305 outputs a signal showing whether or not each lot of products can be manufactured before the date of delivery. This signal is input to the parameter-setting circuit 306.

If the signal input to the circuit 306 shows that there is a lot of products which cannot be manufactured by the deadline, the parameter-setting circuit 306 assigns this lot to a row of neurons which has a higher priority, and also alters the connection coefficients $\omega$ of the hierarchial groups of neurons, in accordance with Equation (20). Let us assume that the neural network system has determined that the lot A, the lot B, and the lot C should be manufactured in this order, and also that the check circuit 305 determines that the lot B cannot be produced by the deadline. Then, the parameter-setting circuit 306 assigns the lot B and the lot A to the first and second rows of neurons, respectively, and also alters the connection coefficients $\omega$ of the hierarchial groups of neurons. After the reassignment of the lots A and B, and the alteration of the coefficients $\omega$ have been accomplished, the control circuit 307 drives the neural network 303 again, whereby the network 303 finds a new solution to the optimization problem.

The control circuit 307 repeatedly drives the neural network 303 until the network 303 obtains the solution which the requirements that all lots of products can be manufactured and delivered by the respective deadlines. The operation of the control circuit 307 will be described, with reference to the flow chart shown in FIG. 25.

First, the control circuit 307 instructs the parameter-setting circuit 306 to set the parameters of the neural network 303 at initial values (Step U1). Then, the control circuit 307 drives the neural network 303 (Step U2). The control circuit 307 determines whether or not a predetermined time has passed, to find whether or not the network 303 has gone into a stable operating condition (Step U3). If YES, the circuit 307 instructs the check circuit 305 to determine whether or not all lots of products can be delivered by the deadlines (Step U4). The check circuit 305 determines whether or not all lots can be produced by the respective deadlines (Step U5). If NO in step U5, the control circuit 307 instructs the parameter-setting circuit 306 to alter the parameters of the neural network 303, so that the order of manufacturing the lots of products can be optimized (Step U6). Then, the check circuit 305 determines whether or not the circuit 306 has altered the parameters (Step U7). If NO, the step U7 is repeated. If YES, the operation returns to the step U2. The control circuit 307 repeats the steps U2 to U7 up until it is determined, in the step U5, that all lots of products can be delivered by the respective deadlines.

Thus can the neural network system solve, within a short time from the sparking condition of the neurons, the optimization problem of in what order the lots of products should be manufactured to be delivered by the respective deadlines, and to minimize the cost of preparation for producing one lot, after producing another.

When the system shown in FIG. 24 finds a solution that any lot of products cannot be delivered by the deadline, it can obtain an optimal solution by the following method, not by assigning the lots to the rows of neurons. That is, the optimal solution can be obtained by changing the levels of the bias signals supplied to the neurons, the threshold values thereof, or the output functions thereof, such that those neurons of the row assigned to the lot, which belong to the columns preceding the column of the sparked neuron of the same row, can spark more readily than before. In this case, too, the system obtains an optimal solution. To be more specific, if the system determines that the lot assigned to the second row is the third one to produce, and that this lot cannot be delivered by the deadline, then a bias signal at a higher level than any other bias signal is supplied to the neuron of the second row and the first column and also to the neuron of the second row and the second column. Alternatively, the threshold value h of these neurons is reduced, or the output function f thereof can be changed.

The neural network system illustrated in FIG. 24 can be applied to solve the Traveling-Salesman Problem, in which case it suffices to assign priorities to the cites the salesman must visit, not to the lots of products which are to be manufactured. Also, the system can be employed to solve other similar optimization problems.

The input/bias signal supplying circuit 304, the check circuit 305, the parameter-setting circuit 306, and the control circuit 307 can be replaced by a single component such as a microcomputer.

The neural network system shown in FIG. 24 also makes an effective use of the parallel processing performed by the neural network, thereby instantaneously placing a number of input signals in descending order, in accordance with their levels. Hence, the system (FIGS. 21 and 23) can instantaneously detect the highest-level signal, the lowest-level signal, and the intermediate-level signal. This system can therefore output, without a delay, a reliable control value, i.e., the average level of only those of the analog input signals, which are at levels close to the intermediate level.

Moreover, to achieve an alarm processing, the third embodiment of the invention need not check every analog input signal to see whether or not the signal is at a level falling outside a specific range. Rather, it is sufficient for the system shown in FIGS. 21 and 23 to determine whether or not the highest-level signal is at a level higher than an upper limit and whether or not the lowest-level signal is a level lower than a lower limit.

Moreover, the neural network system illustrated in FIG. 24 can quickly find a solution to the Traveling-Salesman Problem, and can also quickly determine the order in which lots of products must be manufactured, in order not only to minimize the cost of preparation for producing one lot after another, but also to deliver all lots of products by the respective deadlines.

Like the first embodiment, the second and third embodiments can have a plurality of neural networks. If this is the case, the neural networks are operated simultaneously, to select the optimal one of the outputs of these networks and use this output as a control value.

What is claimed is:

1. A neural network system comprising:
    N neural networks having different set-values which define operations of the N neural networks, said set-values being arbitrarily settable, where N is an integer greater than 1, each having a plurality of artificial neurons arranged in rows and columns, an output of each artificial neuron being fed-back to other artificial neurons of the same row and column, said N neural networks operating in parallel;
    first means, connected to said N neural networks, for receiving outputs of said N neural networks, obtaining energy function values which indicate energy states of the N neural networks, comparing the energy function values, and determining a minimum energy function value from among the energy function values based on the outputs of the N neural networks; and
    output means, connected to said N neural networks and said first means, for receiving a signal from said first means, said signal indicating a first neural network having said minimum energy function value, and outputting an output of said first neural network having the minimum energy function value.

2. The neural network system according to claim 1, wherein said first means includes means for receiving each of the outputs of said N neural networks.

3. The neural network system according to claim 1, wherein said first means includes re-setting means, connected to said N neural networks, for re-setting the set values of said N neural networks and operating said N neural networks again after said first means determines said first neural network having said minimum energy value.

4. The neural network system according to claim 1, wherein said first means includes:
    first setting means, connected to said N neural networks, for setting said N neural networks at different set-values after said first means determines said first neural network having said minimum energy value, and means for repetitively operating said N neural networks M times, where M is a positive integer greater than 1;

second means for obtaining and storing an energy function value of each of said N neural networks;

means for selecting P (P being a positive integer) of N×M energy function values obtained by and stored in said second means, which are less than any other energy function values; and second setting means for setting set-values of said N neural networks and for operating said N neural networks, said set-values having values similar to those set to said N neural networks when the P energy function values are obtained.

5. A neural network system according to claim 1, wherein each of said neural networks comprises a plurality of artificial neurons connected to one another; said set-values are at least one of a bias value, an output coefficient, and an initial value of a calculation amplifier.

6. A neural network system according to claim 1, wherein said N neural networks have a same structure and different set-values.

7. A neural network comprising:
a plurality of artificial neurons each having a respective readiness for activating arranged in rows and columns;

connecting means for connecting said plurality of artificial neurons to one another in an inhibitory synaptic manner so that only one artificial neuron is activated in one row and one column, the connecting means connecting a neuron to every other neuron in a same row and column; and means for dividing said plurality of artificial neurons into hierarchical groups;

wherein the artificial neurons of each hierarchical group have a readiness for activating which is different from that of any other hierarchical group; and wherein said hierarchical groups are one of rows of artificial neurons, columns of artificial neurons, and groups each consisting of artificial neurons having the same (i+j) value, where i is a row serial number, and j is a column serial number.

8. The neural network according to claim 7, wherein said setting means sets the readiness for activating the artificial neurons of each hierarchical group differently by setting a bias signal supplied to the artificial neurons, a threshold value thereof, the output function thereof, or inhibitory connection coefficient thereof differently.

9. The neural network according to claim 7, further comprising said hierarchical groups being rows or columns of artificial neurons, and input means for inputting an input signal to each of the artificial neurons of the same column or row;

said input means inputting input signals to artificial neurons in every row and column.

10. The neural network according to claim 7, wherein means for assigning the rows or columns of artificial neurons to events, respectively, and assigning the columns or rows of artificial neurons are assigned to the priorities of the events, so that an order in which the events should take place is determined by processing signals output from all the artificial neurons.

11. The neural network according to claim 10, further comprising:

first means for determining whether or not there is an event which will not satisfy a predetermined condition according to results of processing of signals of the artificial neurons;

parameter-setting means for changing the activating readiness of the artificial neurons related to an event, if any, which will not satisfy the predetermined condition; and second means for detecting that all events satisfy the predetermined condition and for repeatedly controlling said artificial neurons, said first means, and said parameter-setting means until all events satisfy the predetermined condition.

12. The neural network according to claim 10, further comprising:

first means for determining whether or not there is an event which does not satisfy a predetermined condition according to results of processing of signals of the artificial neurons;

parameter-setting means for replacing the row of artificial neurons related to an event, if any, which does not satisfy the predetermined condition with another row whose serial number is less than said rows; and second means for detecting that all events satisfy the predetermined condition and for repeatedly controlling said artificial neurons, said first means, and said parameter-setting means until all events satisfy the predetermined condition.

13. A neural network system comprising:

N neural networks having different operation characteristics, where N is an integer greater than 1, each having a plurality of artificial neurons arranged in rows and columns, said N neural networks operating in parallel;

first means, connected to said neural networks, for receiving outputs of said N neural networks, and calculating energy function values of the N neural networks;

second means, connected to the first means, for comparing the energy function values, and selecting a neural network having a minimum energy function value; and third means, connected to said N neural networks and said second means, for receiving said outputs of said N neural networks and for outputting an output value of the neural network having the minimum energy function value.

14. A neural network comprising:

a plurality of artificial neurons arranged in rows and columns, each artificial neuron having a respective readiness for activating to form hierarchical groups; and connecting means for connecting said plurality of artificial neurons to one another in an inhibitory synaptic manner so that only one artificial neuron is activated in one row and one column;

wherein the artificial neurons of each hierarchical group have a readiness for activating which is different from that of any other hierarchical group; and wherein said hierarchical groups are one of rows of artificial neurons, columns of artificial neurons, and groups each including artificial neurons having the same (i+j) value, where i is a row serial number, and j is a column serial number.

* * * * *